United States Patent [19]
Deering et al.

[11] Patent Number: 4,791,675
[45] Date of Patent: Dec. 13, 1988

[54] VSP CONNECTIVITY PATTERN RECOGNITION SYSTEM

[75] Inventors: Michael F. Deering; Neil Hunt, both of Mountain View, Calif.

[73] Assignee: Schlumberger Systems and Services, Inc., Palo Alto, Calif.

[21] Appl. No.: 815,476

[22] Filed: Dec. 31, 1985

[51] Int. Cl.$^4$ .............................................. G06K 9/00
[52] U.S. Cl. ........................................ 382/18; 382/27; 382/41
[58] Field of Search ............................ 382/41, 18, 27

[56] References Cited

U.S. PATENT DOCUMENTS

| | | | |
|---|---|---|---|
| 3,905,018 | 9/1975 | Gray | 382/27 |
| 4,288,779 | 9/1981 | Otsu et al. | 382/18 |
| 4,295,120 | 10/1981 | Yoshida | 382/27 |
| 4,606,065 | 8/1986 | Beg et al. | 382/18 |

Primary Examiner—Leo H. Boudreau
Attorney, Agent, or Firm—Theodore S. Park; Charles E. Krueger; Robert C. Colwell

[57] ABSTRACT

An image processing system for computing morphological characteristics of object regions in a binary image frame. The characteristics are generated at the frame rate. One embodiment utilizes an architecture including an interconnected delay component, bit packing component and LUT. The output values provided by the LUT are accumulated over one frame cycle to compute morphological characteristics.

15 Claims, 15 Drawing Sheets

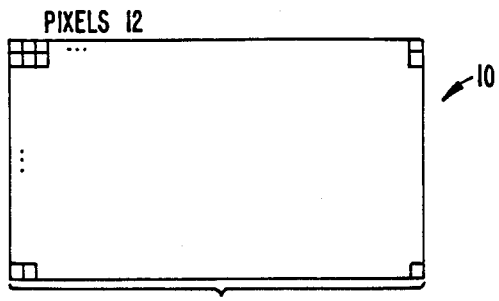
FIG._1.
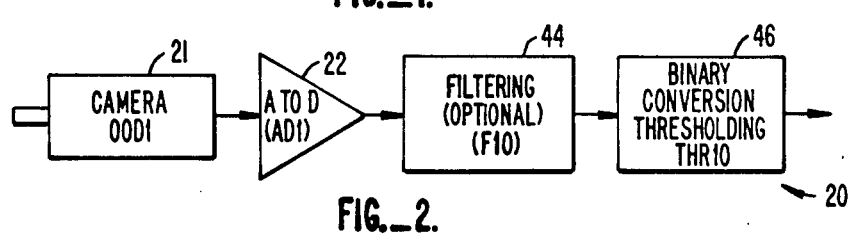
FIG._2.
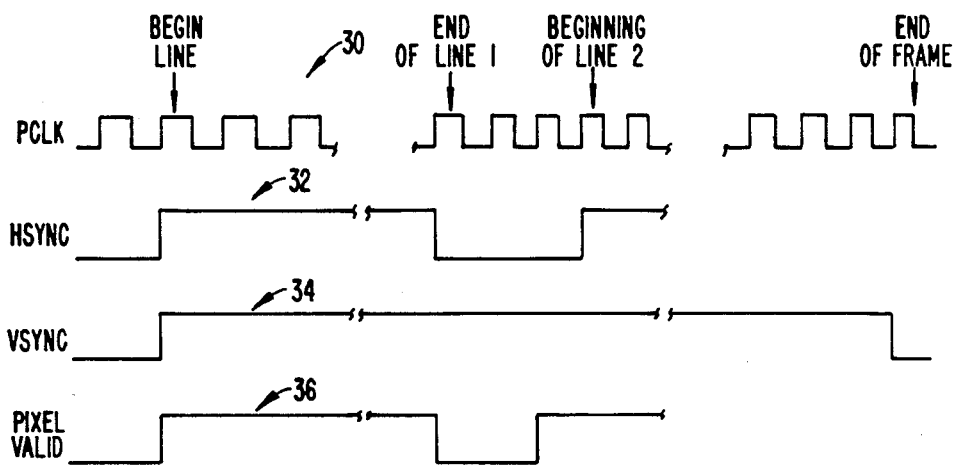
FIG._3.

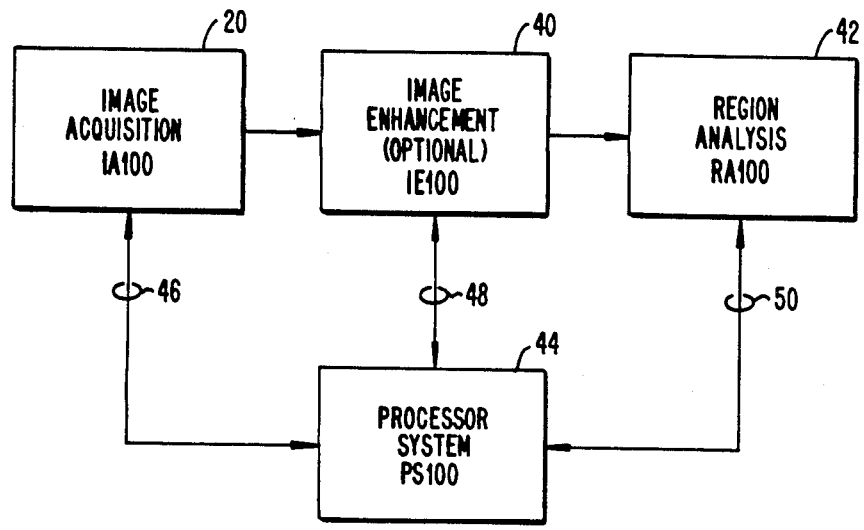
FIG._4.
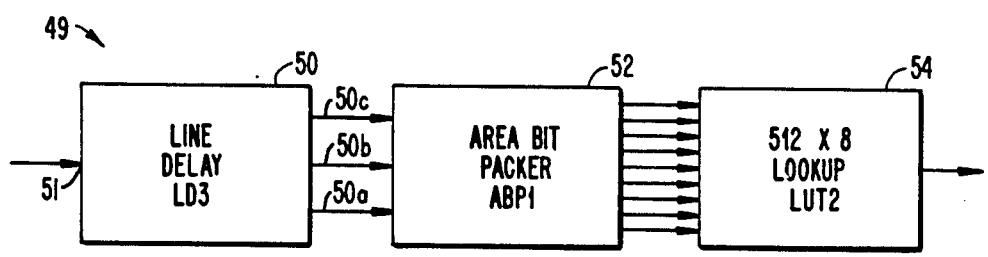
FIG._5.

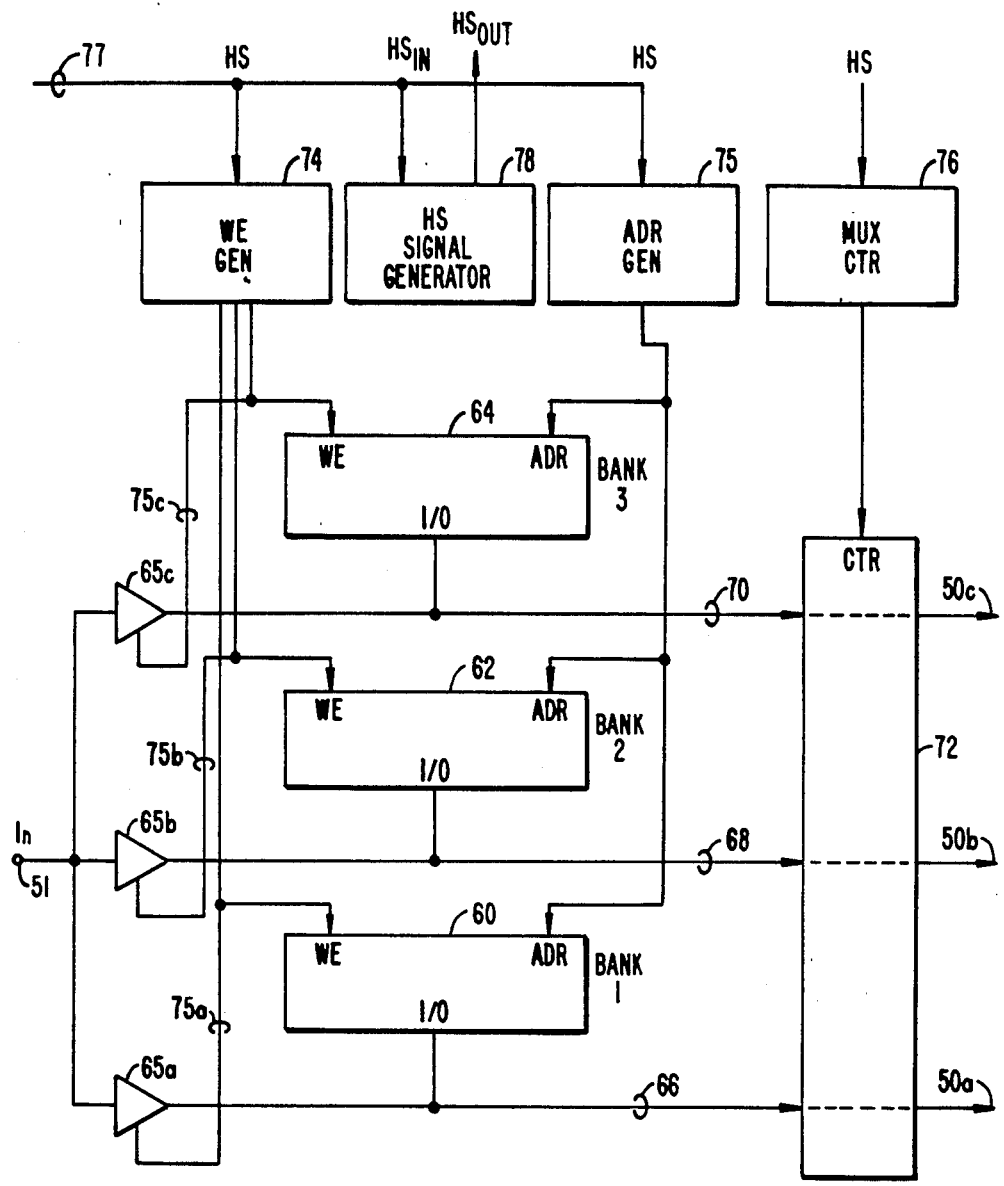
FIG._6.

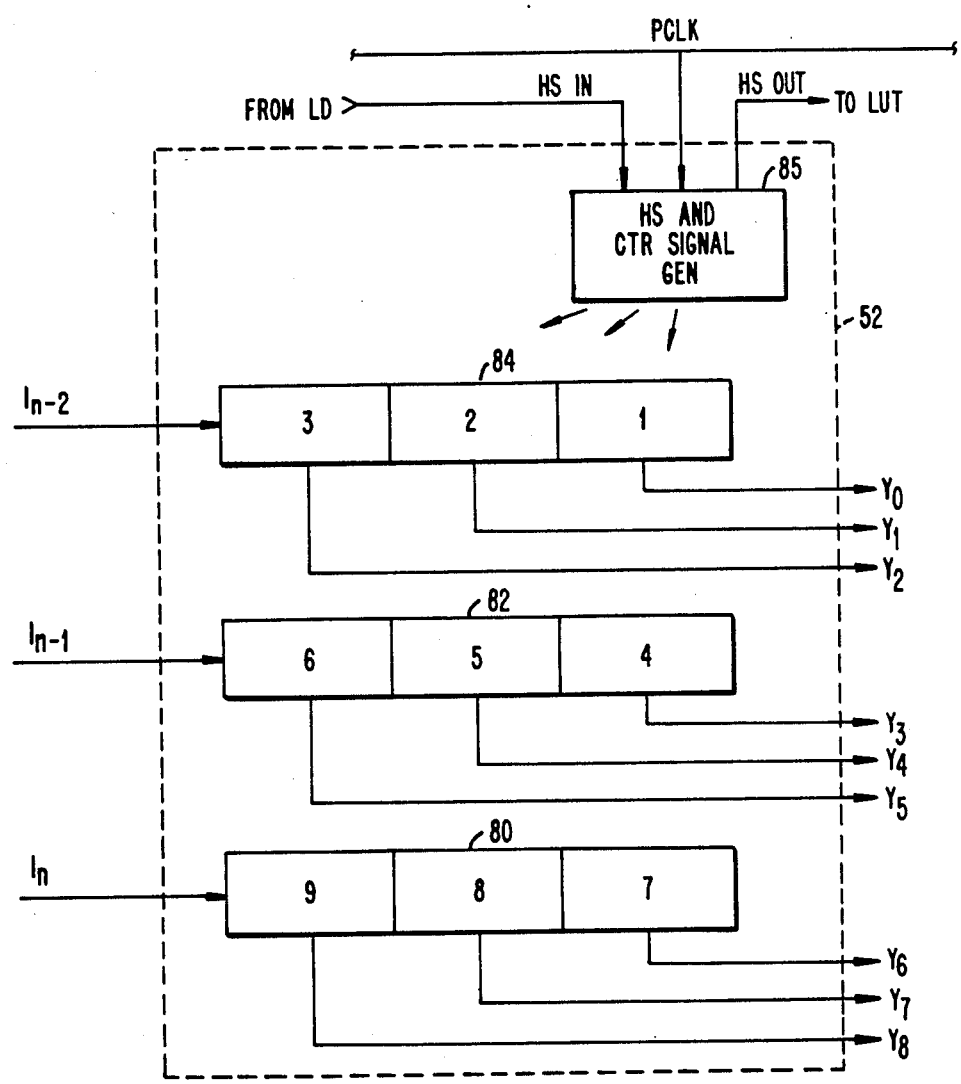
FIG._7.
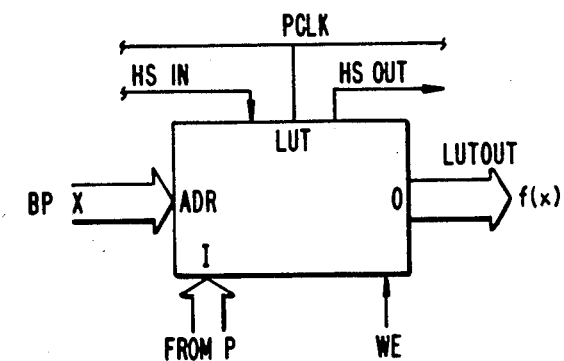
FIG._8.

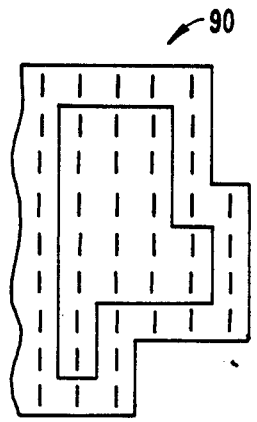
FIG.\_9A.
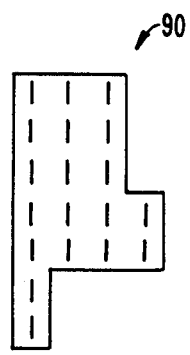
FIG.\_9B.
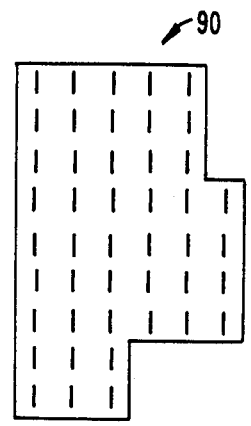
FIG.\_9C.
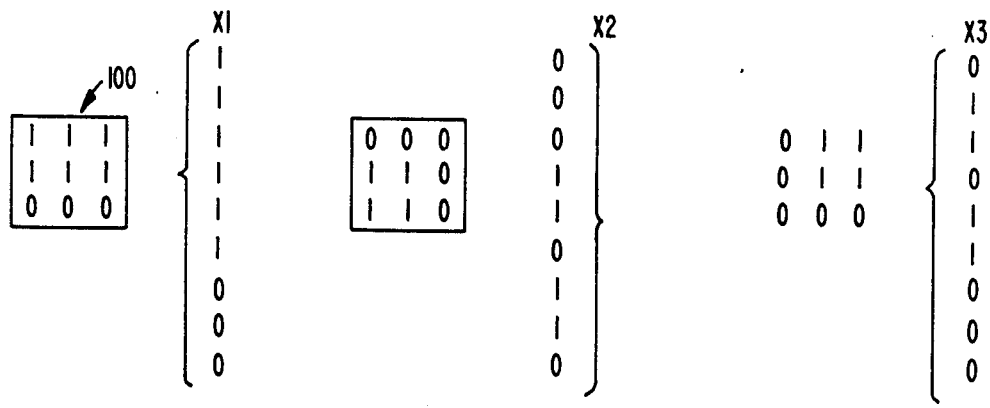
FIG.\_10.
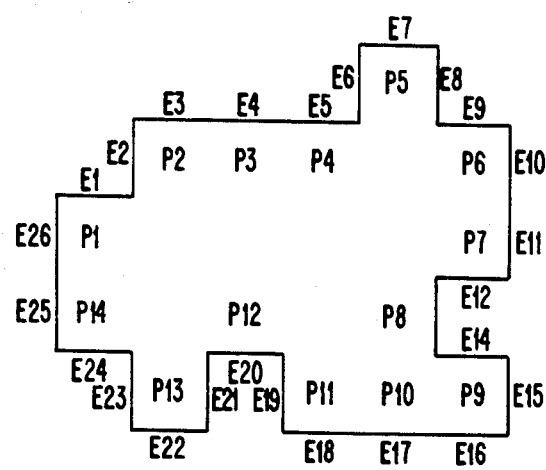
MACRO - 14
1 EDGE - 1    5    3,4,8,10,12
2 EDGE - 2    6    1,2,6,7
3 EDGE - 3    3    11,14
            5,9,13
5 + (6 X 2) + (3 X 3) =
5 + 12 + 9 = 26
FIG.\_11.

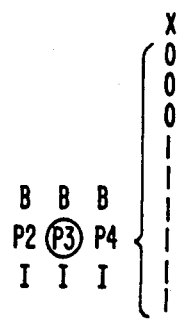
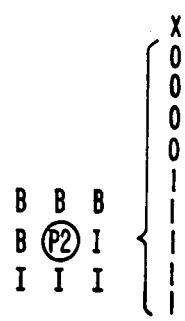
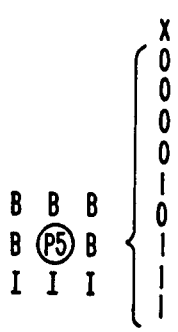
PIXEL 3
1 EDGE
FIG._12A.
PIXEL 2
2 EDGES
FIG._12B.
PIXEL 5
3 EDGES
FIG._12C.
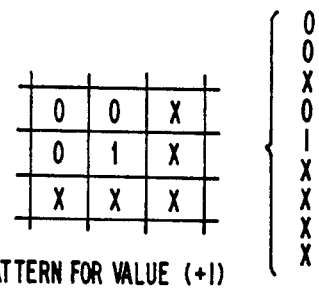
PATTERN FOR VALUE (+1)
FIG._13A.
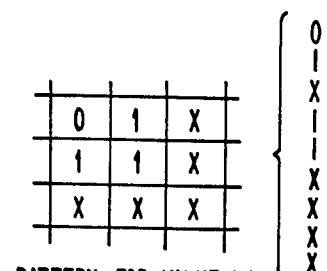
PATTERN FOR VALUE (-1)
FIG._13B.
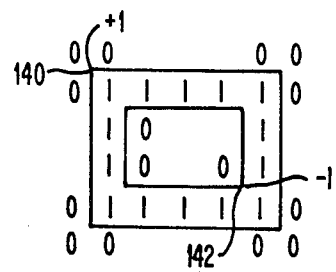
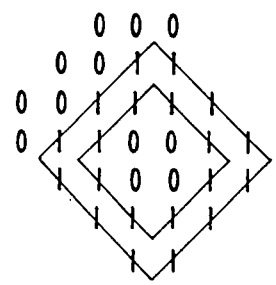
FIG._14A.

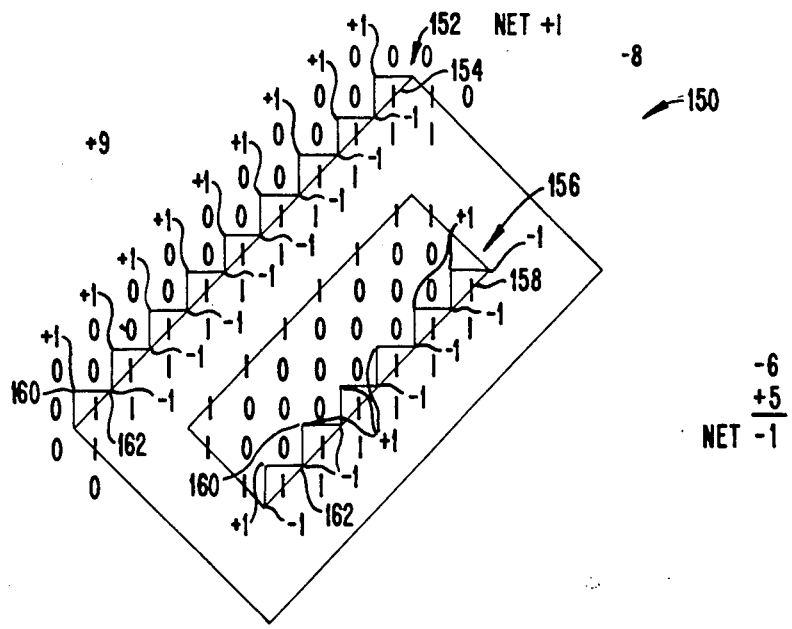
FIG._14B.
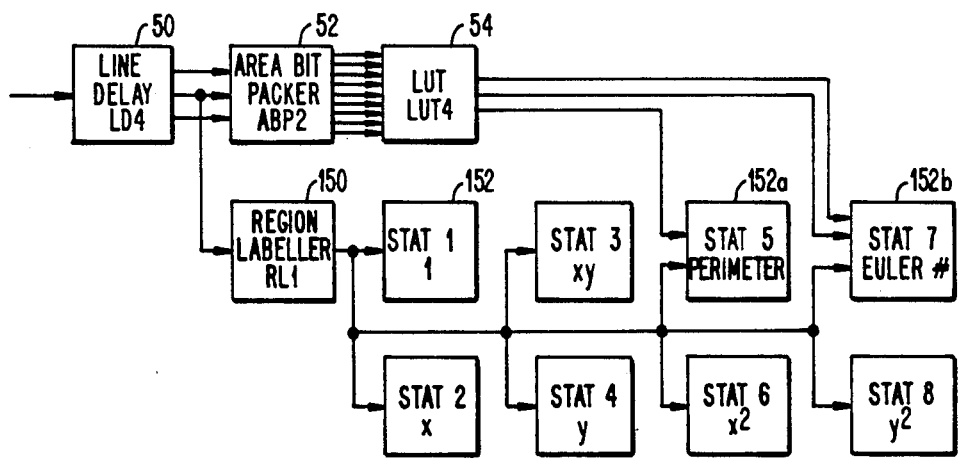
FIG._15.
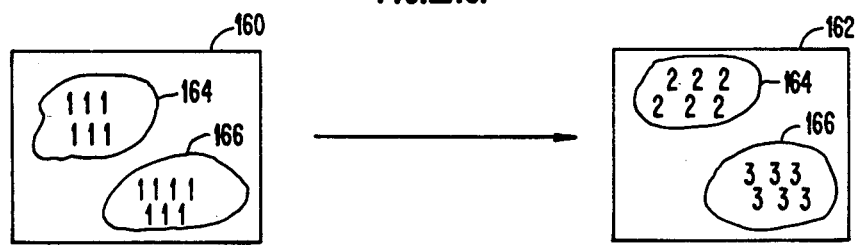
FIG._16.

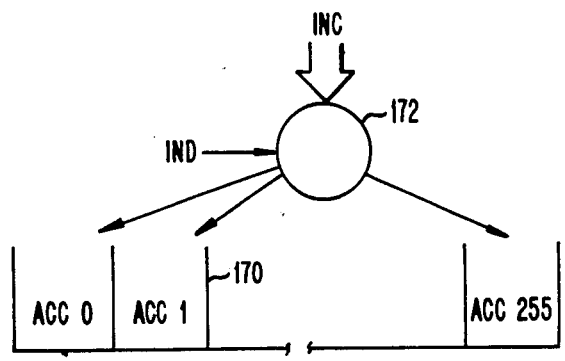
FIG._17.
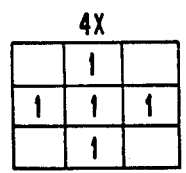
FIG._16A.
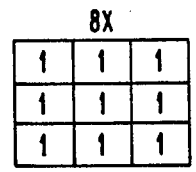
FIG._16B.
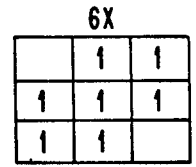
FIG._16C.
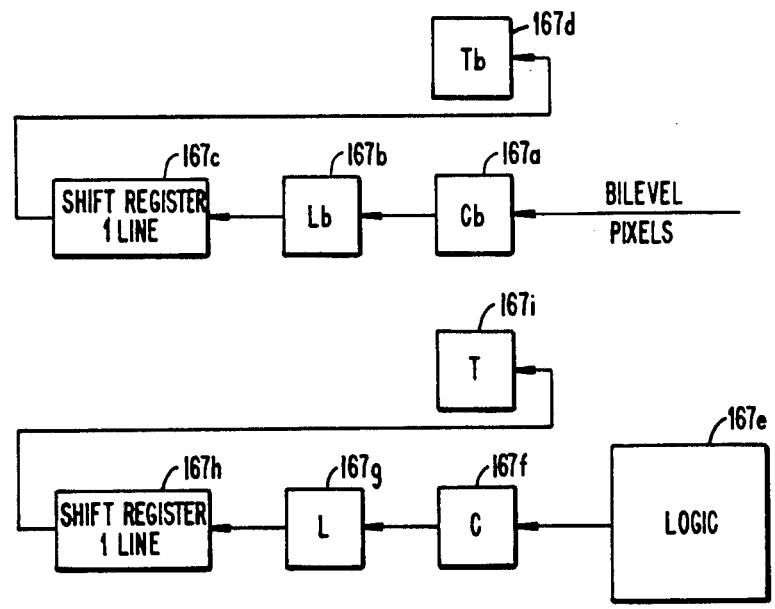
FIG._16D.
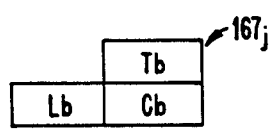
FIG._16E.
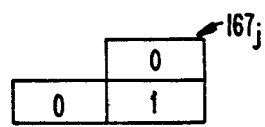
FIG._16F.
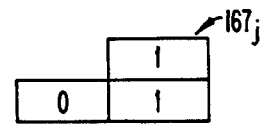
FIG._16G.

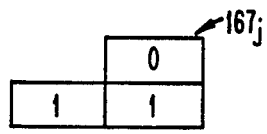
FIG._16H.
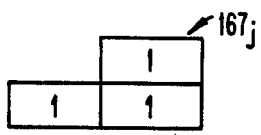
FIG._16I.
ORIGINAL IMAGE
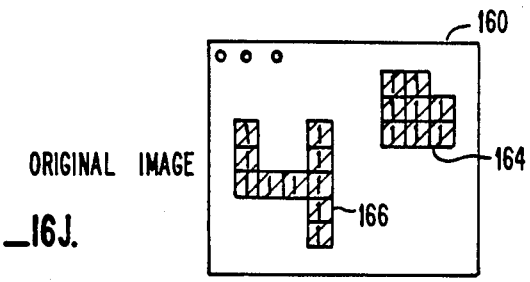
FIG._16J.
NEW REGION
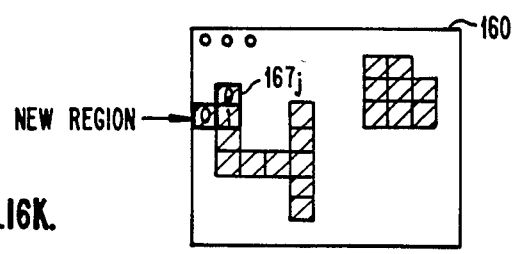
FIG._16K.
PROPAGATING OLD LABEL
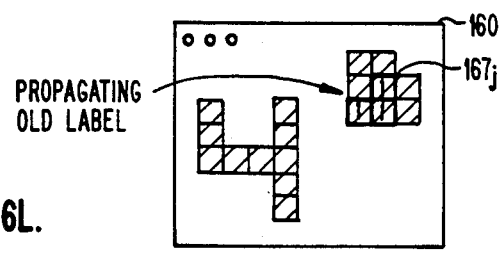
FIG._16L.
PERFORMING A JOIN
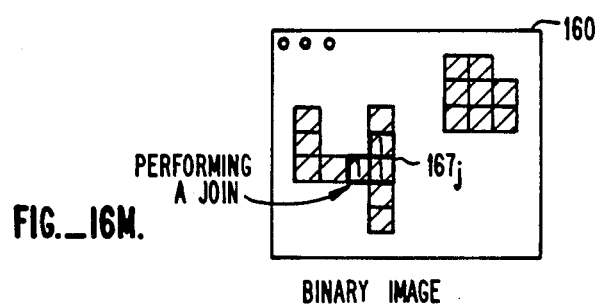
FIG._16M.
BINARY IMAGE
LABELLED OUTPUT

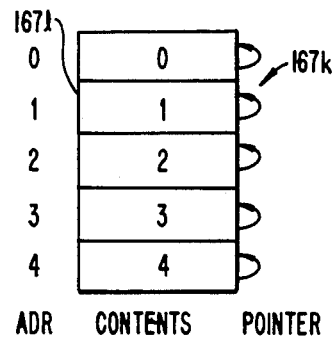
FIG._16N.
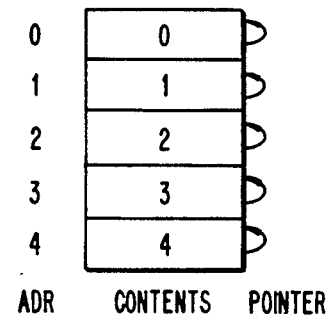
FIG._16O.
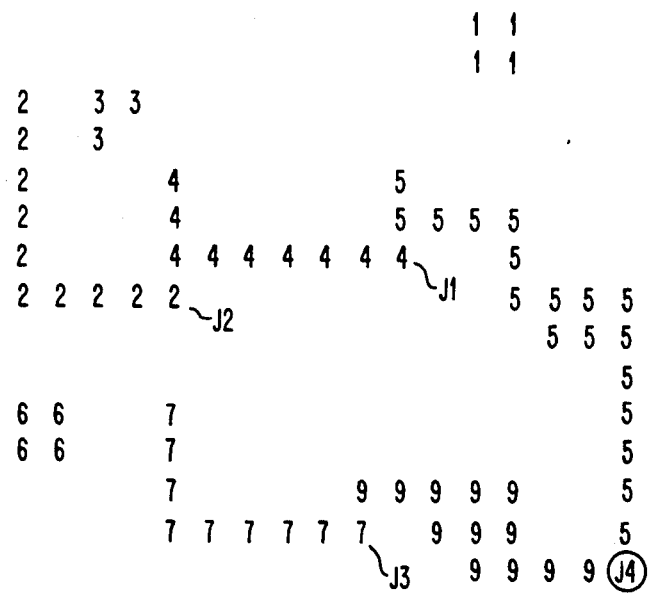
FIG._16P.
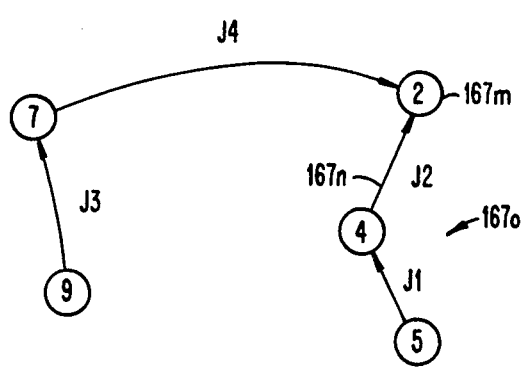
FIG._16Q.
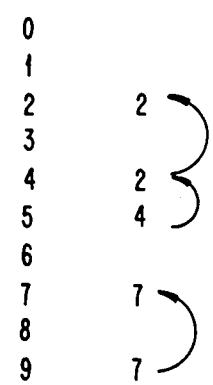
FIG._16R.

FIG._16S.
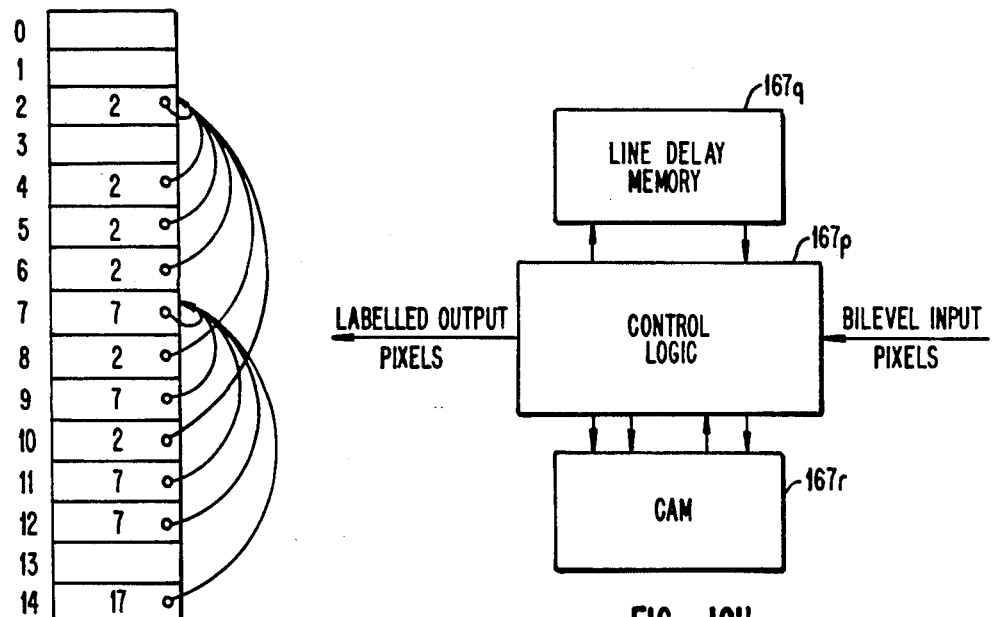
FIG._16T.
FIG._16U.
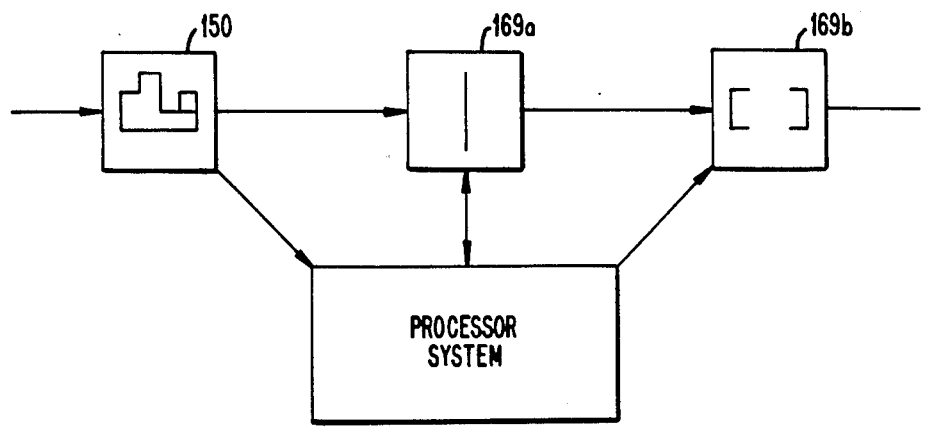
FIG._16Z.

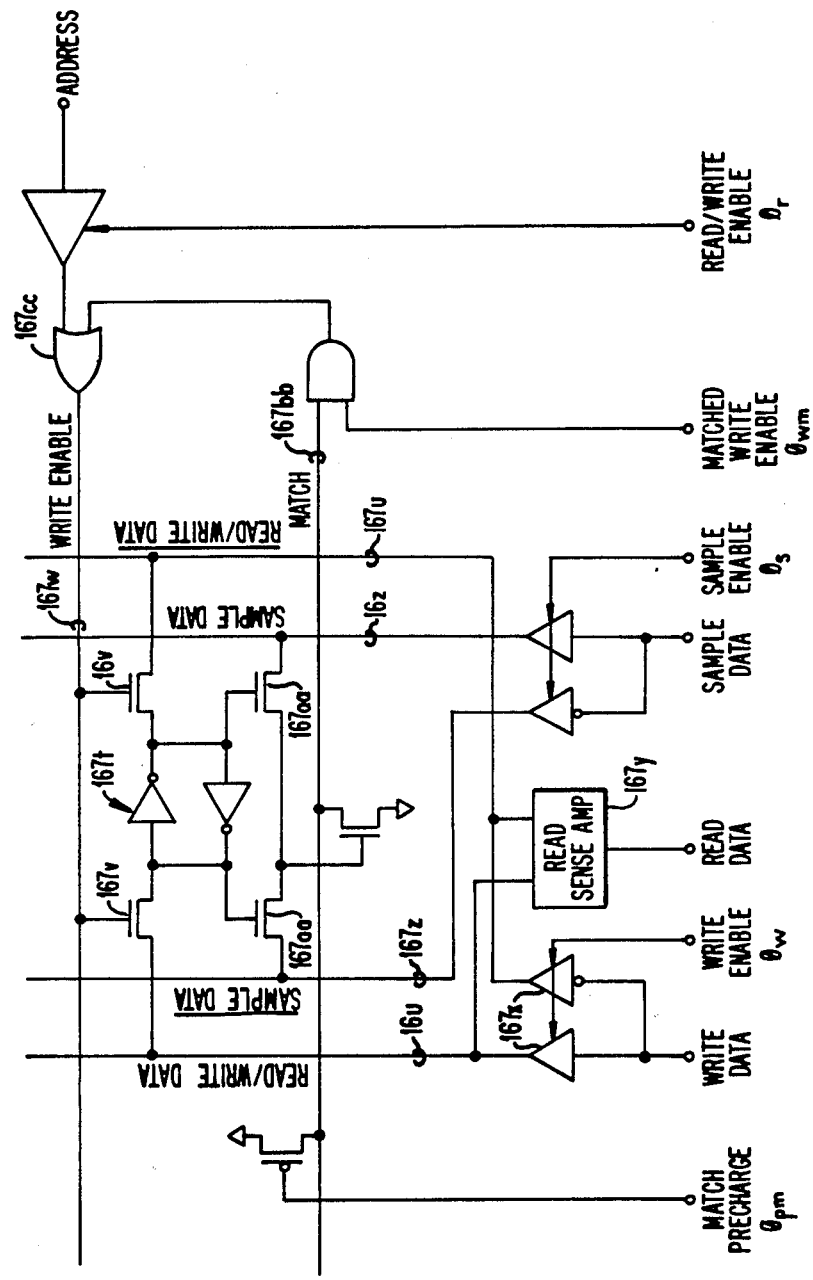
FIG.—16V.

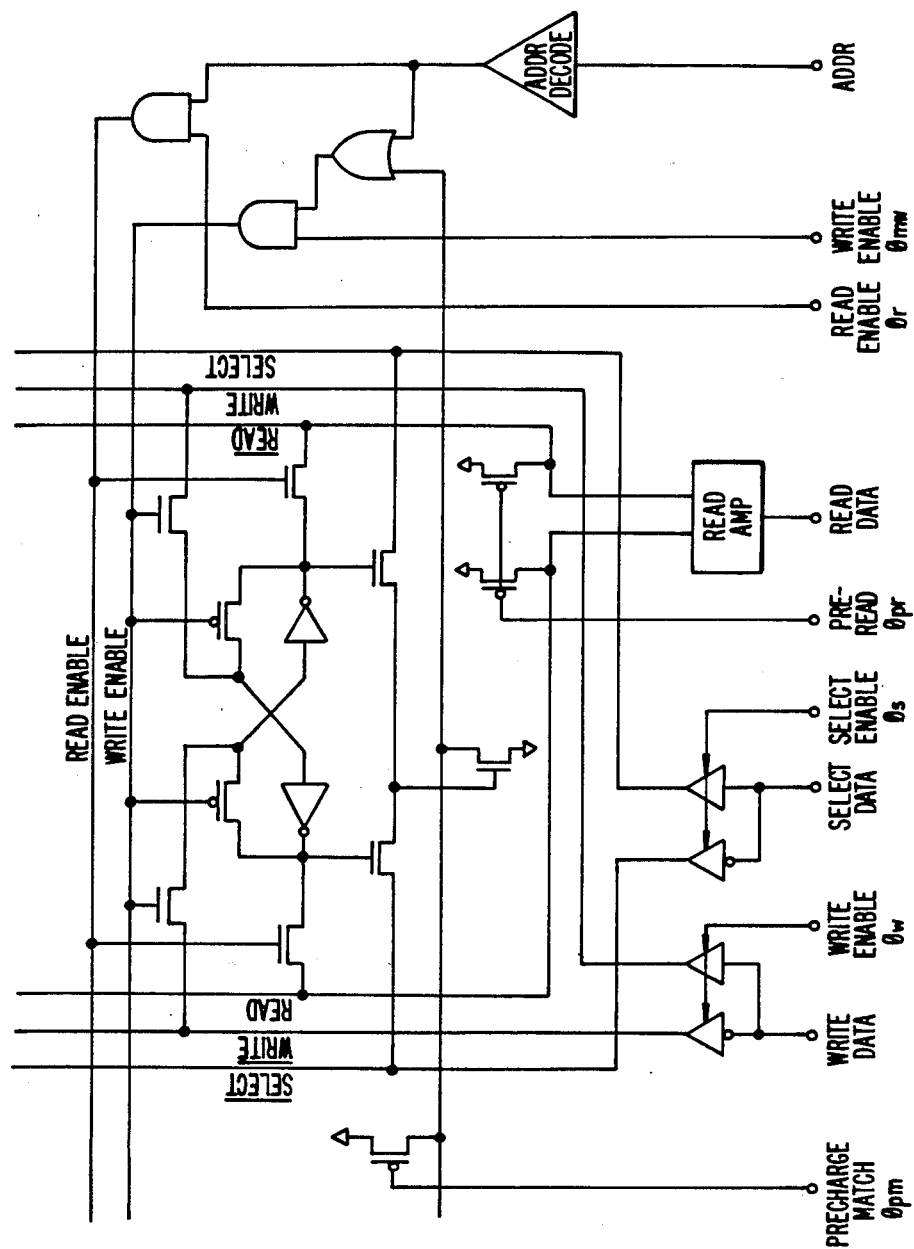
FIG._16W.

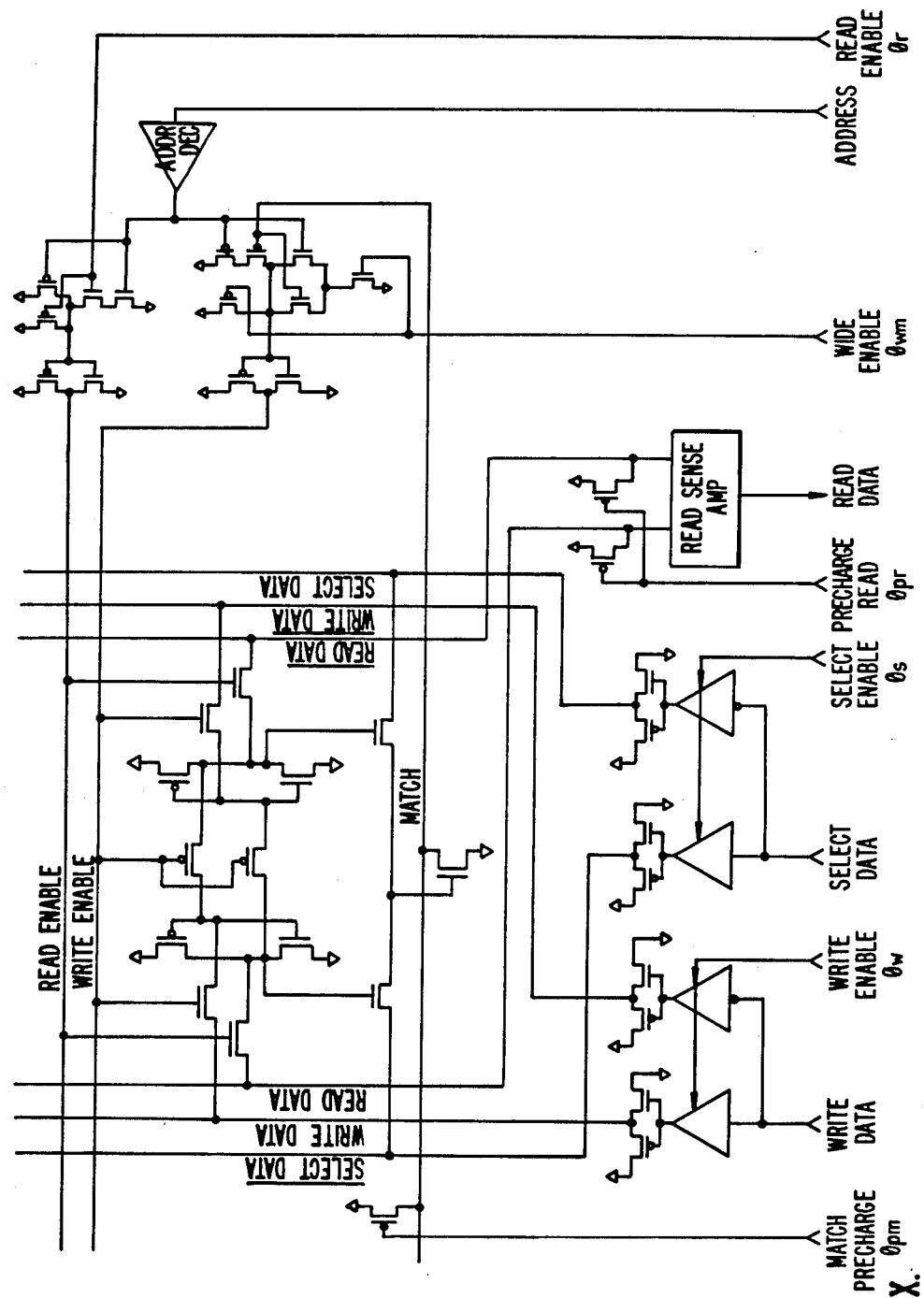
FIG.__16X.

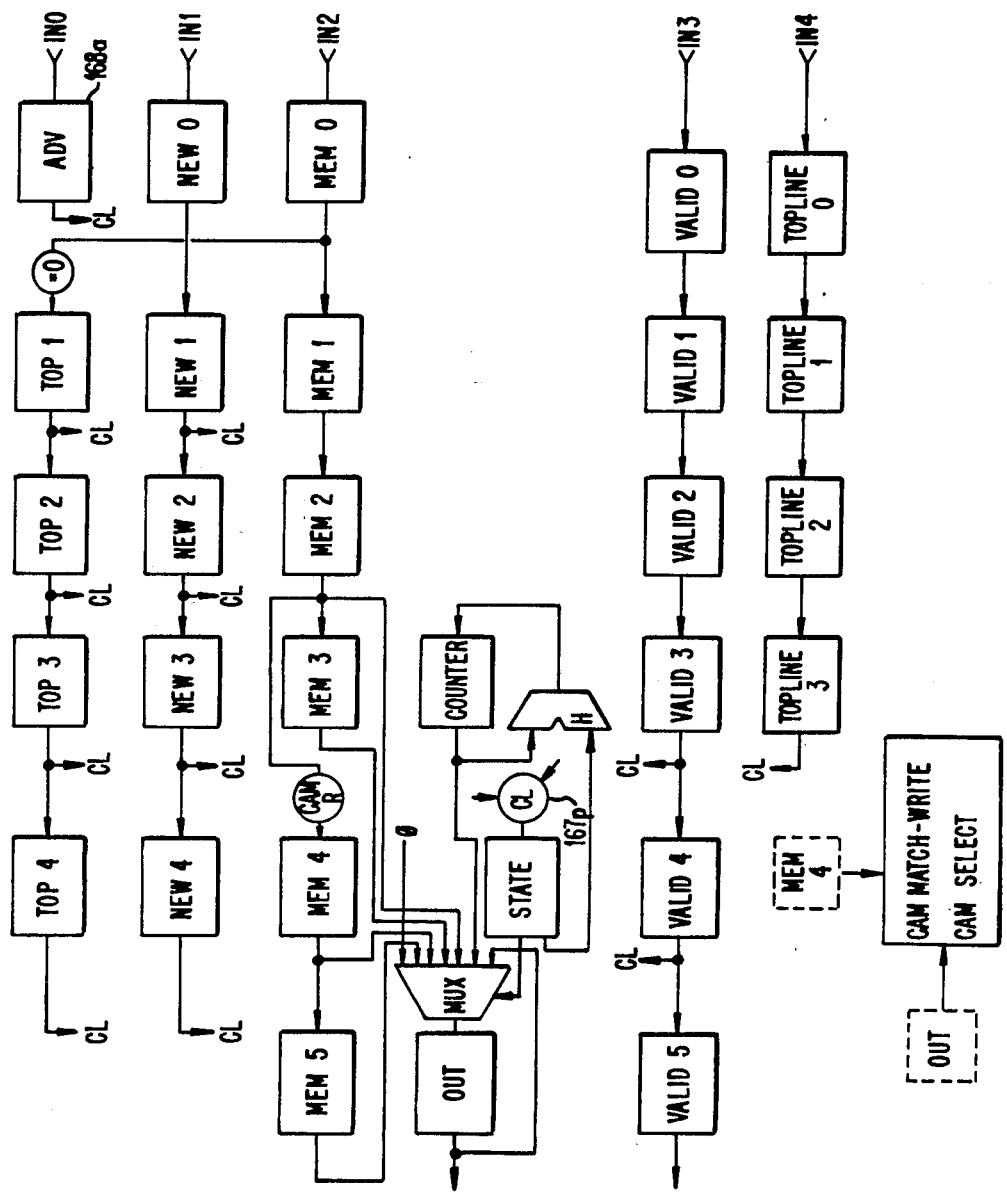
FIG_16Y.

VSP CONNECTIVITY PATTERN RECOGNITION SYSTEM

BACKGROUND OF THE INVENTION

The present invention relates generally to image processing systems and, more particularly, to an image processing system for enhancing and analyzing a digital image.

As robots and other automatic machines are introduced into industry the need for image processing systems to guide these machines has greatly increased.

For example, a robot arm may be assigned the task of sorting nuts and bolts on a moving conveyor belt. The image processing sort must supply the information relating to: (1) the position of each object; and (2) the identity of each object. Also, because the belt is moving and the objects themselves are to be moved by the arm, this information must be continually updated. A typical digital image processing system acquires frames at a rate of about 30 per second. Each of these frames typically has dimensions of 512×512 pixels. Accordingly, in one second a huge amount of data, 7,864,430 pixels per seconds, must be processed.

In existing image processing systems, this huge amount of data precludes the analysis of the frames at the rate that the frames are provided. While the frames are provided every 1/30 second, the processing system information provided by the system is typically updated only every second.

The robot arm, or other automated machine, requires correctional feedback to compensate for positional changes. The speed of operaion of the automated machine depends on the frequency of updating the information supplied by the image processing system. Accordingly, a great need exists for an image processing system that updates information at the rate that image frames are provided to the system.

SUMMARY OF THE INVENTION

The present invention is a system for computing morphological, and other, characteristics of regions in a binary labelled frame. These characteristics may be compared to stored reference characteristics to determine the identity of objects in the frame.

Two particularly useful morphological characteristics are the perimeter and Euler number of a region. Other characteristics of interest include dimension, position, and orientation characteristics. Several characteristics may be needed to distinguish between objects having similar values of one characteristic.

A particularly beneficial attribute of the present system is its capability to compute a characteristic, or a set of characteristics, at the frame rate. This capability facilitates feedback to and correction by an automated system at the maximum possible rate.

According to one aspect of the invention, a functional quantity is assigned to a center pixel positioned at the center of a rectangular region of a frame. The value of the functional quantity is determined by the pixel values in the rectangular region.

According to a further aspect of the invention, the functional value is substituted for the pixel value of the center pixel to generate a processed image.

According to a further aspect of the invention, a selected functional value is accumulated to compute a morphological characteristic of an object region in the frame.

In one embodiment of the invention, a region labelling system labels each object region, or subregion, in a frame with a separate index. This index is used by a statistics component to route functional values from different object regions, or subregions, to separate accumulators identified by the index of the region. The quantity in each accumulator at the end of a frame cycle is the computer value of a selected morphological, or other, characteristic of each labelled region.

In one embodiment, an architecture of a morphological component for generating the selected functional values includes a line delay element for outputting J adjacent lines of a frame, a bit packer element, for outputting the pixel values of J×K region of the frame, and a look-up table, for mapping the J×K pixel values into a selected functional value.

According to a further aspect of the invention, a set of selected functional values may be simultaneously generated and accumulated to compute several morphological characteristics in parallel.

Other advantages and features of the invention will be apparent in view of the drawings and following detailed description.

BRIEF DESCRIPTION OF THE DRAWINGS

FIG. 1 is a schematic diagram of a frame of pixels.

FIG. 2 is a block diagram of an image acquisition system.

FIG. 3 is a set of timing diagrams for handshake signals.

FIG. 4 is a block diagram of the image processing system of the present invention.

FIG. 5 is a block diagram of a system for performing binary morphological processes.

FIG. 6 is a schematic diagram of the delay line unit.

FIG. 7 is a schematic diagram of an area bit packer.

FIG. 8 is a schematic diagram of an LUT.

FIG. 9 is a schematic diagram illustrating a grow operation.

FIGS. 9A and 9B are schematic diagrams illustrating a shrink operation.

FIG. 10 is a set schematic diagram of pixel patterns for pixels on the boundary of an object region.

FIG. 11 is a schematic diagram of an object region.

FIGS. 12A—12C are schematic diagrams illustrating patterns for computing the microperimeter of an object region.

FIGS. 13A and 13B are schematic diagrams of pixel patterns utilized to compute the Euler number of objects in a frame.

FIGS. 14A and 14B are schematic diagrams illustrating the computation of the Euler number.

FIG. 15 is a block diagram of an embodiment of the region analysis subsystem.

FIG. 16 is a schematic diagram illustrating the function of the region labelling unit.

FIGS. 16A–16Z illustrate the operation of the region labelling component.

FIG. 17 is a schematic diagram illustrating the operation of the statistics gathering unit.

DETAILED DESCRIPTION OF THE PREFERRED EMBODIMENTS

FIG. 1 is a schematic diagram of an image frame. The image frame 10 is divided into elemental area unit termed pixels 12. In FIG. 1 the pixels are depicted having square boundaries. Each pixel has an associated pixel value indicating the brightness of the portion of the image incident on the pixel according to a predetermined gray scale. Typically, the frame has dimensions of 512×512 pixels, with each pixel value represented by an eight bit binary number on the gray scale.

FIG. 2 is a block diagram of a typical image acquisition system for use in an image processing system. In FIG. 2, a camera 20, typically a charge coupled device camera, is connected to an analog to digital (A/D) converter 22. The output of the A/D converter 22 is a series of digital signals encoding the gray scale values of each pixel. The A/D converter 22 output is coupled to the input of a filtering unit for improving the quality of the image. The output of the filtering unit is coupled to the input of a binary conversion unit 46 for converting the gray scale image to a binary image. Typically, the binary conversion unit 46 is a thresholding unit programmed with a given threshold value. All gray scale values above the threshold value are converted to a binary 1 and all gray scale values below the threshold value are converted to binary 0. In the system to be described, an object region of pixels in the frame have higher gray scale values than the background region in the frame. Accordingly, the object regions will be labelled with binary "1"'s and the background with binary "0"'s. Of course, the system could also be configured to have the object regions labelled with binary "0"'s and the background labelled with binary "1"'s.

FIG. 3 is a timing diagram illustrating typical handshake signals utilized to coordinate timing of the various subsystems of the image processing system. In FIG. 3, a PCLK signal functions as the basic pixel clock signal. PCLK has a nominal pixel scan rate, RP, of 20 MHz. A "valid" signal indicates whether a valid pixel will be transferred on the next clock cycle. An HSYNC signal 32 is asserted to indicate the extent of each line of data. A VSYNC signal 34 indicates the duration of each frame cycle. The frames are generated at a nominal frame generation rate, RF, of 30 Hz. In FIG. 3, the HSYNC signal remains true while 512 valid PCLK pulses occur and is then false for the duration of the interline gap. The VSYNC signal remains true while 512 valid lines are transmitted. A pixel valid signal 36 is asserted by subsystem components to indicate whether the component output is valid pixel data.

FIG. 4 is a block diagram of the image processing system of the present invention. The output of the image acquisition system 20 is coupled to the input of an optional image enhancement subsystem 40. The output of the image enhancement subsystem is coupled to the input of a region analysis subsystem 42. Each subsystem is coupled to a processor system 44 by processor interfaces 46, 48, and 50.

As described above, the image acquisition system 20 contains a camera or line scanner generating a raster image of a scene containing the object to be analyzed. the image is filtered to remove noise and then thresholded or otherwise converted to binary. Up to 20,000,000 one-bit pixel values per second are transferred to the image enhancement subsystem 40. The active pixels which correspond to object silhouette typically have a value of 1, the inactive pixels which correspond to background, or the absence of object, are typically 0 value.

The image enhancement subsystem 40 performs one or several iterations of a shrink-grow operation. These operations remove small regions of pixels of one value enclosed within regions of pixels of the other value. This so called "salt and pepper" noise removal reduces the number of discrete connected regions of active pixels. In certain cases, the image may be of sufficient quality that shrink and grow operations are not needed. In this case, the binary pixels from the image acquisition system 20 are passed directly to the region analysis subsystem 42.

The region analysis subsystem 42 accepts a stream of binary pixels, where each connected region of binary pixels is considered to be a single object, for analysis. The regions of pixels are first identified, and then various characteristics of each region are computed in parallel. The resulting characteristics are passed to the processor system.

The processor subsystem 44 controls the special purpose hardware in the other three subsystems and interprets the characteristics from the region analysis subsystem. The processor also compares the characteristics supplied by the region analysis subsystem 42 with stored characteristics previously computed from reference objects. Accordingly, if these characteristics compare then the object in the frame is identified as the reference object having the same characteristics. The processor system 44 also interfaces with external systems and communicates the results of the computation performed by the image analysis subsystem.

FIG. 5 is a block diagram of a basic architectural unit utilized in both the image enhancement and region analysis subsystems 40 and 42. This architecture functions as a morphological component of the image analysis system. In the present embodiment, each component is implemented on a silicon substrate utilizing VLSI technology. Referring now to FIG. 5, a line delay element 50 has an input coupled to receive a stream of binary pixel values representing a frame. The outputs of the line delay element 50 are provided to the inputs of an area bit packer (ABP) 52. A look-up table (LUT) has an input port coupled to the output port of the ABP and an output port for providing a functional output.

The function of this architecture 49 is to generate a set of selected functional values that depends on the values of the pixels in a particular 3×3 rectangular region of a frame.

In the image enhancement system 40, the LUT 54 is programmed to provide functional values of the pixels in the enhanced image. The detailed operation of the image enhancement subsystem 40 will be described below.

In the region analysis subsystem 42, the functional values are programmed to be accumulated over the duration of a frame. These accumulated functional values are utilized to compute morphological characteristics of objects in the frame.

The functions of the components of the architecture 49 depicted in FIG. 5 will now be described.

The line delay unit 50 accepts a given line of pixels, $l_n$, at its input port 51, where $n=0, \ldots N-1$. Each line, $l_n$ contains ordered pixel positions, $p_r$, with $r=0, \ldots, R-1$. A typical frame is square of 512×512 pixels so that $N=R=512$. The output at the first line delay output port 50A comprises the binary pixels in line $l_n$. The output signals generated at the second and third line delay output ports 50B and 50C correspond to the lines $l_{n-1}$ and $l_{n-2}$, respectively. The pixel value corresponding to the same pixel position, $p_r$, in each of the above-identified lines is provided at the output ports 50A–50C during the same PCLK cycle. Thus, the output signals from the line delay element provide three adjacent lines of the frame. The pixel values of each of these lines is provided at the pixel scan rate, RP.

The ABP 52 accepts the three lines of the frame from the line delay element and maps the pixel values at pixel positions $p_r$, $p_{r+1}$, and $p_{r+2}$, in each of the three image lines $l_n$, $l_{n-1}$, and $l_{n-2}$, into the single bit positions of a 9-bit area bit packer output signal, Y. This output signal is transferred to the LUT by a 9-bit digital bus.

The function of the look-up table is to provide a digital morphological functional value at its outputs for selected values of the 9-bit ABP output signal. This relationship is illustrated in Equation 1.

$$D = f(Y) \qquad \text{EQ. 1}$$

In Equation 1, D is the digital output signal provided by the LUT 54, Y is the digital input signal to the LUT 54 provided by the ABP 52, and f represents the function generated by the LUT 54. In practice, the LUT output signal, D, is an eight-bit binary signal. The various bit planes in the eight-bit output signal may be programmed to generate different morphological functions.

Equation 2 is an exemplar of a possible programming scheme for the various bit planes.

$$D_0 = f_0(Y)$$
$$D_1 = f_1(Y)$$
$$D_2 = f_2(Y)$$
$$D_3 = f_2(Y)$$
$$D_4 = f_3(Y)$$
$$D_5 = f_3(Y)$$
$$D_6 = f_4(Y)$$
$$D_7 = f_4(Y) \qquad \text{EQ. 2}$$

The LUT is programmed so that the value of the first bit, $D_0$, of the LUT output signal is equal to the function $f_0$ of the APB output signal. The second bit, $D_1$, is equal to the function $f_1$ of the APB output signal. The functions $f_0$ and $f_1$ are single bit functions. The LUT is programmed so that the third and fourth bits of the LUT output signal are equal to a functional value specified by $f_2$. Accordingly, $f_2$ may have four values, i.e., 00, 01, 10, or 11. Similarly, the fifth and sixth bits of the LUT output signal indicate the functional values $f_3$ and $f_4$, respectively.

Specific examples of $f_0$, $f_1$, and $f_2$ will be given below with regard to desired functions of the architecture of FIG. 5.

A set of functional values is generated each PCLK cycle. These functional values may be utilized for processing the image frame or computing morphological characteristics. Several functional outputs may be processed in parallel each PCLK cycle.

FIG. 6 is a more detailed schematic diagram of the delay line unit 50. Referring now to FIG. 6, three memory banks 60, 62, and 64 each include an I/O port, ADR port, and write enable port (WE). The delay line input port 51 is coupled to the input ports of first, second, an third tri-state buffers 65a, 65b, and 65c. The output of each tri-state buffer is coupled to first, second, and third data buses 66, 68, 70, respectively.

In one implementation, a single VLSI chip includes all of the control elements described here and also includes the three banks of memory. Each bank of memory is sufficient to hold up to 256 pixels in each line. If the line length is greater than 256 pixels, then an alternative embodiment is used where the same VLSI chip is connected to external static RAM chips of sufficient size to hold the length of line.

The first data bus 66 is coupled to the I/O port of the first memory bank 60 and a first input port of a switching circuit 72. Similarly, the second data bus 68 is coupled to the I/O port of the second memory bank 62 and a second input port of the switching circuit 72, and the third data bus 70 is coupled to the I/O port of the third memory bank 64 and a third input port of the switching circuit 72.

The WE enable ports of the first, second, and third memory banks 60, 62, 64 and control inputs of the first, second, and third tri-state buffers 65a, 65b, and 65c are coupled to first, second, and third inputs of a WE signal generator 74 by WE lines 75a, 75b, and 75c.

The ADR ports of the memory banks are coupled to the output port of an ADR generaor 75. A switch controller 76 has an output coupled to a control input of the switching circuit 72. The WE generator 74, ADR generator 75, and switch controller 76 each have a handshake input port, coupled to a HS(in) bus 77, for receiving incoming handshake signals comprising the PCLK signal and the HSYNC, VSYNC, and pixel valid signals generated by the data acquisition system.

A delay element handshake signal generator 78 includes a handshake input port for receiving the incoming handshake signals and a handshake output port. The output ports of the switching circuit are coupled to the output ports of the line delay element 50A, 50B, and 50C.

The operation of the circuit depicted in FIG. 6 will now be described for the case where pixels in lines, $l_n$, are being supplied to the line delay input port 51. The address generating circuit 65, the write enable signal generating circuit 66, and the switch control 74 receive the incoming handshake signals, HSYNC, VSYNC, and pixel valid, on the handshake in bus 76.

The address generator counter output spans on address space for the pixels in each line (000–511). The counter 68 is initialized by the HSYNC, VSYNC, and pixel valid signals at the termination of a given line and frame. The ADR generator is incremented by PCLK when pixel valid is asserted.

In this example, the first write enable signal for the first line bank 60 is asserted by the write enable signal generator 74 so that the first tri-state buffer 65a transmits the pixels in $l_n$ to the first data bus 66 and so that pixel $p_0$ is stored in storage location 0, $p_1$ is stored in storage location 1, and so on. The pixels in the previous two lines of the frame, $l_{n-1}$ and $l_{n-2}$, were similarly stored in banks 1 and 2, 62 and 64, respectively, during previous line cycles.

While the pixels in line $l_n$ are being written into the first bank 60, the write enable signals for banks 1 and 2 are not asserted by the write enable signal generator 66. The second and third tri-state buffers 65b and 65c isolate the third and fourth data buses 68 and 70 from the delay element input port. Thus, when address signal $ADR_j$, is generated, pixel $p_{r=j}$ of lines $l_{n-1}$ and $l_{n-2}$ are read from the second and third banks 62 and 64, respectively, and pixel $p_{r=j}$ of line $l_n$ is written to location $ADR_j$ and bank 060.

The switching circuit 72 selectively couples each input port to a selected output port under control of the signal received at the control input port. The switching circuit output ports are the delay output ports 50a, 50b, and 50c.

In this example, the first, second, and third input ports are coupled to the first, second, and third output ports of the switching circuit. Thus, the pixels of $l_n$ are transferred to the first output port 50a, the pixels of line $l_{n-1}$, stored in the second memory bank 62, are transferred to the second output port 50b, and the pixels in $l_{n-2}$, stored in the third memory bank 64, are transferred to the third output port 50c.

The HS generator 78 receives the incoming handshake signals generated by the image acquisition system. These incoming signals provide time references for generating the addresses and WE enable signals to process pixels in the line delay element 50. The line delay element 50 introduces processing delays so that the output pixels from the line delay element 50 are no longer defined by the time frame defined by the incoming handshake signals. The handshake generator 82 generates line delay handshake signals that define line, frame, and valid pixel time references for the output pixels of the line delay element 50.

The basic clock signal PCLK is supplied to each component. However, the handshake signals, HSYNC, VSYNC, and pixel valid that define the time references for the component output pixels are generated at each component. All handshake signals are referenced to PCLK and all components operate at the frequency of PCLK, RP.

Accordingly, corresponding pixels in each of three adjacent lines of the frame are provided to the line delay output ports 50A-50C at the pixel rate.

FIG. 7 is a more detailed schematic diagram of the ABP 52. The ABP 52 includes three three-bit shift registers, 80, 82, and 84. The input of the first shift register 80 is coupled to the first output port of 50A of line delay element 50, the input of the second shift register 82 is coupled to the second output port 50B of the line delay element 50, and the input of shift register 2 is coupled to the third output port 50C of the line delay element 50. The nine-bits stored in the three shift registers 80, 82, and 84 at any given time represent the pixel values in a 3×3 neighborhood of the frame.

An HS and CTR signal generator 85 receives the PCLK signals and handshake signals from the line delay component 50. These signals are utilized to generate control signals for shifting valid pixels through the shift registers 80-84 at the PCLK rate. The HS generator 85 also generates HS out signals for defining a timing reference for the pixels transmitted by ABP 52.

For convenience of description, the bits in the 3×3 neighborhood are labelled with the first bit being in the uppermost right hand corner and the last bit being in the lower left hand corner and with the bits labelled across each shift register and then down to the next shift register. The shift register elements of the shift registers 80, 82, and 84 are coupled to the nine-bit output port (Y) of the ABP 52.

Accordingly, the nine-bit (Y) word presented at the ABP output port uniquely represents the value of the pixels in the 3×3 neighborhood of the frame.

The ABP output signal (Y) defines a pixel pattern centered at a center pixel positioned in position 5 of the 3×3 region. For a given frame supplied to the ABP, nine-bit output signals can not be generated for pixels in the top and bottom rows and first and last columns of the frame. Accordingly, the ABP output signal is defined over a smaller frame then provided to the ABP inputs.

A functional output of the ABP is sequentially generated for every valid pixel in the frame at the pixel scan rate, RP.

The functional output for a particular pixel occurs during the PCLK cycle that the particular pixel is a center pixel, i.e., is positioned at position 5 of the ABP 52.

The ABP generates HS out signals to reference the values of the functional outputs to the frames and lines defined by the center pixels. The handshake signals generated by the ABP define the time reference for this smaller frame.

FIG. 8 is a detailed schematic diagram of the look-up table 54. In FIG. 8 the look-up table comprises a random access memory (RAM) having 512 storage locations with each storage location selected by an address signal provided to the address input of the RAM. Each storage location stores an eight-bit word. The stored words are provided from the processor element subsystem 44 (FIG. 4) and program the LUT 52 to provide selected functional outputs at the RAM output port for specified values of the ABP output signal (Y) provided to the RAM address port. For example, if the ABP output signal (Y) is equal to "000000001" and the desired value of the functional output were f(Y)="10000000", then the eight-bit digital word "10000000" is stored at the RAM storage location addressed by the address "000000001". As described above with reference to FIG. 5, bit planes corresponding to specific bits in the LUT output signal (D) may be independently programmed to specific functional values.

A specific utilization of the architecture of FIG. 5 to perform an image enhancement function will now be described with reference to FIG. 9. It is desirable to eliminate object regions consisting of only a few pixels from the plane prior to region analysis. These regions do not represent real objects in the scene, but result from noise. These noise objects are often called "salt and pepper" regions and may cause errors in the region analysis subsystem computation results. A salt region may be an isolated object pixel in the background and a pepper region may be an isolated background pixel in an object region.

The elimination of a salt pixel by a shrink operation followed by a grow operation will now be described with reference to FIGS. 9A-9C.

In FIG. 9A an object region 90 and a salt region 92 are depicted. In a shrink operation, all pixels on the boundary of an object are converted from object pixels, value "1", to background pixels, value "0". The result of the shrink operation is depicted in FIG. 9B. Note that the salt pixel 92 has disappeared.

In a grow operation, all background pixels adjacent to the boundary of a region are converted from background pixels, value "0," to object pixels, value "1". The result of a subsequent grow operation is depicted in FIG. 9C. The object region 90 has returned to its original contours and salt region 92 has been eliminated.

A general image enhancement operation may comprise a series of shrink operations followed by the same number of grow operations, or, even a sequence of such shrink and grow operations.

The programming of the LUT 54 to accomplish a shrink operation will now be described. The shrink operation is programmed in the first bit plane of the LUT 54. Signal output $D_0$ is utilized to provide the pixel signal for generating a frame.

Utilizing the configuration of FIG. 7, the pixel at position 5, designed the center pixel, in the 3×3 array is analyzed to determine whether it is positioned on the boundary of an object.

FIG. 10 depicts several configurations where position 5 is at the boundary of an object. The bit packer output signal Y is also listed. FIG. 10 is not intended to be exhaustive, but merely illustrative.

For each BP output Y0, corresponding to configuration where the center pixel is on the boundary of an object, the word stored at location Y0 is "0xxxxxxx". Where x means "don't care". Thus, the functional output on line $D_0$ of the LUT output signal bus is "0" for Y=Y0. For those center pixels in the background, corresponding to output signal YBG (YBG="xxxx0xxxx"), the word stored at location YBG is "0xxxxxxx". For center pixels within the object, the bit packer output is YW. The word stored at location YW is "1xxxxxxx". Thus, for center pixels on the boundary of an object or in the background, $D_0=0$ and, for pixels in the interior of an object, $D_0=1$. If the $D_0$ output signal is utilized as a pixel signal, then the regions in the frame generated by the $D_0$ signal are shrunk.

The grow operation is similarly implemented in the second bit plane of the LUT output signal. Center pixels are analyzed to determine whether they are background pixels positioned adjacent to the boundary of an object. If so, the functional output of $D_1$ is "1". For background center pixels not adjacent to an object, the signal value $D_1$ is 0 and, for center pixels interior to an object the signal value at $D_1$ is 1.

Use of the architecture of FIG. 5 to generate functional values useful for computing morphological characteristics of an object will now be described with reference to FIGS. 11 and 12. The first computational operation described is the computation of the perimeter in an object of a frame. The present example is for a frame having one object region, however, a system for computing the perimeters, or other morphological characteristics, of several objects in a frame, is described below.

FIG. 11 depicts an object region in the frame. Note that the shape depicted in FIG. 11 is an approximation to the true shape of a real object. The square edges resulting from the scanning technique are not necessarily congruent to the edges of the actual object. Accordingly, any algorithm for computing the perimeter will merely generate an approximation to the true perimeter of the object. In FIG. 11 the pixels on the exterior boundary of the object are labelled from P1-P14. Additionally, the pixel edges on the boundary of the object are labelled from E1 to E26.

The first algorithm for computing the perimeter of the object utilizes a macroperimeter approach wherein the perimeter of the object is set equal to the number of pixels on the boundary of the object.

This function is programmed into the third bit plane of the LUT. As described above for the grow operation, bit packer outputs Y0 corresponding to center pixels on the boundary of the object are given the value $D_2=$"1" and bit packer outputs for all other center pixels either in the background or the interior of the region are assigned the value "0". Thus, the output at $D_2$ is 1 only for the fourteen pixels on the boundary of the object. By summing the outputs on $D_2$ in an accumulator over one frame cycle the macrovalue of the perimeter is calculated.

A second algorithm calculates the number of edges on the boundary of the object and generates a microperimeter measure. The functional values, $f_4(Y)$, are either 0, 1, 2, or 3 and therefore must be programmed into two bit planes. The functional outputs are generated on the fourth and fifth bit planes, $D_3$ and $D_4$. FIGS. 12A, 12B, and 12C given an indication of the construction of the function. In FIGS. 12A-C background pixels are labelled "B", interior pixels are labelled "I", and perimeter pixels are given a label corresponding to FIG. 11. For a center pixel in the background or the interior of the region, the functional value at $D_5$ and $D_4$ is "00". FIG. 12A depicts a center pixel having one edge adjacent to the background. These pixels are assigned the functional value $f_4(Y)=H$. FIG. 12B depicts center pixels having two edges adjacent to background pixels. These pixels are given the functional value $f_4(Y)=+2$. FIG. 12C depicts center pixels having three edges adjacent to background pixels. These pixels are given the functional value $f_4(Y)=+3$. The bit packer outputs, Y for each of the configurations depicted in FIG. 12A-12C are also listed on the figure.

By accumulating the values output on lines $D_3$ and $D_4$ over the frame cycle, the micromeasure of the object's perimeter may be generated.

The computation of a second morphological parameter, the Euler number of an object will now be described with reference to FIGS. 13A and 13B and FIGS. 14A and 14B. The Euler number for a single object is 1-(number of holes in the object). For a frame including several objects, the Euler number for the frame is (the number of objects)—(the number of holes). FIGS. 13A and 13B depict the two patterns utilized to generate the functional output for the Euler number. This function $f_5(Y)$ requires two bit planes to span the three functional values +1, −1, and 0. FIG. 13A depicts the pattern for generating a functional value of +1 and FIG. 13B depicts the pattern for generating a value of −1. All other patterns generate the functional value 0.

The first pattern of FIG. 13A depicts the top left outside corner of an object and the second pattern, FIG. 13B, depicts the bottom right hand inside boundary of a hole in an object.

FIGS. 14A and 14B illustrate the operation of the first and second patterns of FIG. 13 to generate the Euler number. In FIGS. 14A, a simple square object having a single square hole is depicted. Note that the only position on the object that fits the first pattern (FIG. 13A) is the upper left hand corner 140. The only position that fits the second pattern (FIG. 13B) is the boundary of the lower right hand corner of the hole 142. Accordingly, the Euler number is +1 −1, or 0.

FIG. 14 depicts the more complicated case where the rectangular object 150 is oriented in a diagonal fashion. Because of the nature of the pixel geometry, the 45° edge of the object is represented as a staircase of pixels. A first staircase 152 defines the outer left edge 154 of the object 150 and a second staircase 156 defines the inner right boundary 158 of the hole in the object 150. Each staircase of pixels 152 and 156 include outer step edges 160 and inner step edges 162. The external upper left boundary 154 of the region 150 is a staircase having nine outer edges 160 and eight inner edges 162. The first pattern (FIG. 13A) corresponds to the outer edges 160 of the staircase 152 and the second pattern (FIG. 13B) corresponds to the inner edges 162 of the staircase 152. Accordingly, the staircase corresponding to the outer edge 152 generates nine +1 functional outputs and eight −1 functional outputs.

Referring now to the lower right boundary 158 of the hole, that staircase includes six inner edges 162 and five outer edges 160. Accordingly, if the functional values are accumulated over the frame cycle from the left edge of the figure 150 there is generated (+9 −8) for a net +1 and from the lower right hand boundary of the hole there is generated a (−6 +5) for a net −1. Accordingly, the Euler number of the object is 0. This confirms that the rectangle has a hole.

From the examples of FIG. 14A and 14B, the principles of using the first and second patterns to calculate the Euler number for a complex shaped region are easily understood.

The set of functional outputs required to compute the macroperimeter, microperimeter, and Euler are generated each PCLK cycle. Thus, all three of these characteristics can be computed in parallel each frame cycle.

FIG. 15 depicts an architecture for computing morphological characteristics for the case where several objects are present at one time in a single frame. In FIG. 15 the line delay unit 50, are bit packer unit 52, and LUT 54 of the architecture of FIG. 5 are depicted. The second output port 50B of the line delay 50 is coupled to an input port of a binary region labeller unit 150 by labeller bus 151. The output of the binary region labeller unit 150 is coupled to the index input of a statistics chip 152. Selected functional outputs, D, of the lookup table 54 are coupled to increment inputs of the statistics unit 152. The output of the statistics unit provides data to the processor 44.

The function of the binary region labeller unit 150 is illustrated in FIG. 16. FIG. 16 illustrates the conversion of a binary unit 160 including two objects to a labelled region image 162. Note that all pixels in the first region 164 of the binary frame 160 are labelled with the same index, e.g., 2, in the region labelled frame 162. Similarly, the pixels in the second region 166 of the binary frame are labelled by the index 3.

The binary region labeller component 150 is intended to accept a stream of bilevel pixels in raster scan order, and output a labelled image also in raster scan order. Clearly, without having enough memory to store the entire image, such a component cannot perform a complete labelling. (Consider a U-shaped region; at first the binary region labeller 150 sees two separate regions, and assigns two labels; subsequently it sees the join, and cannot recall the pixels with the second label in order to relabel them with the first label.) However, a partial labelling can be achieved, and the join equivalence data can be made available to the control processor at the end of the frame.

For the binary region labeller unit 150 to function at the frame rate the problem of rapidly joining partially labelled regions must be solved. An embodiment of a region labelling unit suitable for use in the system depicted in FIG. 15, will now be described with reference to FIGS. 16A-Z. This embodiment performs partial labelling and provides join equivalence data.

FIGS. 16A-C illustrate various definitions of connectivity. FIG. 16A is an example of four connectedness; the four pixels which share a common edge with the given pixel are defined to be connected to that pixel.

FIG. 16B is an example of Eight Connectedness; the eight pixels which either share an edge or a corner vertex with the given pixel are defined to be connected to that pixel.

FIG. 16C is an example of six connectedness; six connectedness allows a consistent view of the labelling of object and background. (The alternative is to label objects with four connectedness and background with eight connectedness or vice versa). Six connectedness is derived from a hexagonal pixel grid, where each pixel shares an edge with six others. This is represented on a square pixel matrix by defining the connected pixels to be the four connected pixels plus two of the four vertex adjacent pixels which lie on one of the diagonals. There are thus two definitions of six connectedness, which we call left and right six connectedness.

FIG. 16D is a block diagram of a system for labelling connected regions in a binary frame. Bilevel pixels arrive at the input on the top right, and are clocked through a Cb register 167a, a Lb register 167b, and into a first shift register 167c. Exactly one line after a pixel was in the Cb register 167a, it is clocked from the other end of the shift register 167b and into a Tb register 167d.

A box labelled logic 167e can read the values of the Cb (current), Lb (left) and Tb (top) registers 168a, b, d, at every cycle, and determine the connectivity of the pixels visible. It generates a label for the current pixel, or outputs a zero if there is a background pixel in the Cb register 167a. This label is clocked from a C register 167f to an L register 167g, through a second shift register 167h, and appears in a T register 167i one line later. The values of the L and T registers 167g and i are also available to the logic, so that if the current pixel is an object pixel (Cb=1) and it is joined to an object pixel on the line above (Tb=1), then the label which was used for the pixel on the line above is available in the T register 167i, and is copied into the C register 167f. If the current pixel is an object pixel, and the pixel to the left is also an object pixel (Lb=1), then the logic will copy the label it used for the previous pixel from the L register into the C register.

If all three registers Cb, Tb, and Lb 167a, 167b, and 167d show object pixels, and the T and L registers 167i and 167g show the same label, then this label is used for the current pixel C. However, if the T and L registers 167i and 167g are different, this signifies that two regions which were previously thought to be separate are now found to be the same. A note of this join is made, and one of the labels is chosen for labelling the current and connected subsequent pixels. At the end of the frame, the join data is available to the control processor, which can take the appropriate action to join the two subregions.

Four connected labelling is performed utilizing the basic L-shaped configuration 167j depicted in FIG. 16E.

FIGS. 16F-I, illustrate the possible values in the bilevel Tb, Cb, and Lb registers 167d, 167a, and 167b as the L-shaped configuration 167j scans the lines in a frame. Only those cases where the pixel in the Cb register 167a, the current pixel, is an object pixel are shown. In all other cases the logic outputs a zero as the new label for the current pixel.

In FIG. 16F, Tb=Lb=0 and a new label is generated for Cb. In FIG. 167G the label for the pixel in the line above is used, i.e., C=T. In FIG. 16H the label for the pixel of the left is used, i.e., C=L.

In FIG. 16I, if the labels used for T and L are the same, then this value is used for the current pixel, i.e., C=T=L. If these labels are different, then a join has been found. The current pixel may be labelled with either the value T or L.

FIGS. 16J–M illustrate the labeling of a simple set of first and second regions 164 and 166 in a frame 160 is depicted In FIG. 16J, a frame of pixels having two connected regions is depicted. In FIG. 16J, the pixels in lines $l_2$ and $l_3$ have been labelled "1" and the L-shaped configuration has the first pixel in the second region 166, on line $l_4$, as the current pixel. This is the configuration of FIG. 16j. Thus, a new label, "2", is generated Similarly, a new label, "3", is generated for the second pixel of the second region 166 on line $l_4$.

This example illustrates the problem of mislabelling sections of a single region. The frame is scanned one line at a time. The region labelling unit does not "know" that the pixels labelled "2" and "3" on $l_4$ will later join into one region.

In FIG. 16M, the L-shaped configuration 167j has label "3" in T and label "2" in L. This is the configuration of FIG. 16I, with T not equal to L. The system now "realizes" that it has mislabelled region 3. The current pixel is labelled "2" and the remaining pixels in the second region 166 are labelled "2". The system for noting the join is described below.

In the present embodiment, a join is performed by utilizing a content addressable memory (CAM). FIG. 16N is a schematic diagram of an initialized CAM 167k storing five words 167l. Initially, each word contains the address of itself, i.e., each word points to itself.

During the join operation, illustrated in FIG. 16M, the words addressed by the labels in L and T are compared. The value word having the higher value is changed to the value of the word having the lower value. The CAM configuration for this join is depicted in FIG. 16O. Note that word 3 now points to word 2 instead of itself.

FIGS. 16P–R illustrate the joinder problem encountered in labelling a complex region and the motivation for the joinder algorithm described below.

FIG. 16P shows a third region having a more complicated configuration and having several mislabeled subregions. Referring now to FIG. 16P, at J1 it is discovered that the regions heretofore labelled "4" and "5" are, indeed, subregions of the same region. Some action must be taken to note the fact that "5" is equivalent to "4". At J2 and J3 it is discovered that regions labelled "2" and "4" and "9" and "7" are also the same. These facts are also noted. At J4, instead of mistakenly making "9" point to "5", the root of "9", i.e., "7", is made to point to the root of "5", i.e., "2". Because 2 is less than 7, the pixel at J4 is labelled "2".

FIG. 16Q depicts a set notation for the above-described joins. The nodes 167m are the labels for the various regions and the edges 167n represent the joins discovered. A set of nodes 167m connected by edges 167n is a tree 167o. The lowest value of a label in a tree 167o is the root of the tree. The roots of the trees 167o in FIG. 16Q are "2" and "7" before J4 has been executed. The process described with reference to FIG. 16P is illustrated in FIG. 16Q. From FIG. 16Q, at J1 and J2 it is noted that "5" is equivalent to "4" is equivalent to "2". At J3 it is noted that "9" is equivalent to "7". At J4 it is noted "9" is equivalent to "5" by joining the roots of each tree.

FIG. 16R depicts the state of the CAM, corresponding to the graphs in FIG. 16Q, prior to the join at pixel J4.

The pixel at J3 is to be labelled with the lowest value, i.e., the root, of any of the labels assigned to the two subregions to be joined.

Performing a join operation between two nodes M and N in such a representation involves the following tasks. Each node in such a graph may be represented as a word in a memory. Initially, each word contains the address of itself, which signifies an edge pointing from the node to itself. (Each node is a member of the unique set of which it is the root). As two root nodes are joined, the word at the higher address of the two nodes is changed to contain the lower address. In order to perform a join operation between two sets, the root nodes of each set must be found, and this join operation performed. The operation of finding the root of the set involves following the chain of pointers from node to node until a node is found which points to itself. This is the root of the set.

1. The root of the tree (M') in which node M is located is found.
2. The root of the tree (N') in which node N is located is found.
3. The smallest of the M' and N' (R) is determined, and will be used as the new root of the combined set; the largest of M' and M' (J) is determined.
4. A new edge is created from J to R, thus rooting both trees at R.

To join label 9 to label 5: first the root of 9 is found to be 7; next the root of 5 is found to be 2; the larger of these (7) is made to point to the smaller (2). The problem with this set representation in memory is that a join operation may involve many memory references in order to determine the root of each tree before they can be joined. This problem can be transformed into one more tractable on VLSI in the following manner. The height of each tree is reduced to a single level at each join. This means that every node in a set always points directly to the root of that set, and the discovery of the root is reduced to a single memory reference operation. FIG. 16S graphically depicts this representation and FIG. 16T depicts the CAM configuration. (If the root also points to itself, then a single memory reference will always yield the root of any set tree.) The disadvantages is that every node in one set must be modified to point to the root of the other set, now the root of the combined set. A large number of reads is exchanged for a large number of write operations. Fortunately, a CAM architecture allows these writes all to be performed simultaneously.

It is conventional always to select the smaller valued root as the root of the entire structure. However this is not essential; either of the roots of the subregions can be selected as the root of the joined region.

FIG. 16U is a block diagram of a system for performing four and left six connected region labelling, with two pixel lookahead. In both four and left six connectivity, the joins are always between pixels L and T, in the notation above; this simplifies the design of the control logic.

The pixel lookahead is used where a new label would otherwise be generated; in such a case, if it can be seen that the new label would join an existing region within one or two pixel cycles, then the label of that region can be brought forward and used instead of the new label. This technique reduces the number of fragmentary partial regions which are generated. In a set of test images, it was found that one stage of lookahead reduces the number of fragments by approximately a factor of two; the second stage of lookahead reduces this by about another 10 or 20%.

Bilevel pixels are input to a main control logic block 167$p$. Simultaneously the corresponding labelled pixel from the previous line of output is obtained from a line delay memory 167$q$. From this pixel is derived the bilevel pixel corresponding to the labelled pixel, as this is cheaper than storing the bilevel pixel in addition to the labelled pixel. The logic block 167$p$ computes the labelling for the next pixel, and outputs this value. The labelled value is also passed to the line delay memory to store for the next line. A CAM block 167$r$ contains a 256×8 memory designed for content addressable selected writing. This is used to find the root label corresponding to each labelled pixel on the top line as it arrives from the line delay memory, and to perform the join equivalencing as required.

The CAM memory 167$r$ is discussed next.

The memory structure performs the following operations for maintaining sets of label values for a binary region labeller component. Each word represents one label, and the value stored at that word is the root label for the set to which the label belongs.

1. The word size is large enough to hold sufficient labels for labelling the required images.
2. The length of the memory is 2 wordlength words long.
3. It is possible to write the memory in a conventional manner so that the initial "identity" self-pointing root label can be set up in each word.
4. It is possible to read the memory in a conventional manner, so that the root label associated with any label can be discovered, by reading the contents of the location addressed by the label value.
5. When a join is performed, a content addressable write is performed The original root label value for one of the sets is presented to the memory, and all memory words which match this root label value set a flag (those who don't zero the flag). Subsequently, the new root label value is presented, and all those memory locations which originally matched the old root value (i.e. those with the set flag) store the new root value, thus performing the set union operation and maintaining the minimum tree height.

FIG. 16V shows a basic static memory design with suitable circuitry to perform these operations. This design could be fabricated in a 2 micron CMOS process and be built in a 256×8 form.

In FIG. 16V the basic cell 167$t$ is a cross coupled inverter. A pair of complementary read/write lines 167$u$ for each bit is connected to the cell 167$t$ by two transistors 167$v$ which are enabled by a read/write enable line 167$w$. These lines are either driven by a pair of write drivers 16$x$ or are read by a read sense amplifier 167$y$. In this mode of operation the read/write enable line 167$w$ is driven high for exactly one cell by the address decoder logic.

Another pair of complementary sample lines 167$z$ and two transistors 167$aa$ perform the matching operation for each bit. A match line 167$bb$ which runs through all the cells in a given word is used to wire-AND connect 167$cc$ the match functions of each bit to form the match function for the whole word. The match line 167$bb$ in every word where the data did match causes the read/write enable line 167$w$ for each of those cells to be driven high, so that a write cycle can be performed. The data to be written is driven onto the read/write lines 167$u$ by the write drivers 167$x$.

The following operations are performed each in a single clock phase by asserting the appropriate clock connections.

$\phi_{pm}$: Precharge Match Lines. The match line 167$bb$ for every word is precharged. Since both the sample data lines 167$z$ are held low, there is no match line discharge patch. This is performed in the cycle before a sample cycle.

$\phi_s$: Sample. The data to be compared against CAM contents (the sample data) is enabled onto the sample data lines 167$z$. If the contents of any CAM cell 167$t$ fail to match the sample data, then the match line 167$b$ for that word will be discharged to ground.

$\phi_w$: Write. The data to be written to any cell which matched the sample data (the write data) is driven onto the read/write data lines 167$u$. The state of the match line 167$bg$ is driven onto the read/write enable line 167$w$, so that any word where the match line 167$bb$ is still high will store the value of the write data lines 167$u$.

$\phi_{pr}$: Precharge Read Write Lines. The read/write lines 167$u$ are precharged. The read/write enable lines 167$w$ for each cell are disabled, and the write drivers 167$x$ are also disabled, so there is no discharge path for the precharge current during this phase. This is performed in the cycle before a read cycle.

$\phi_r$: Read/Write (Conventional Addressing). The address of the word to be read or written is decoded, and the read/write enable line 167$w$ for the selected word is driven high. For a write cycle, the write data is enabled onto the read/write data lines 167$u$ and the CAM cells store the written value. For a read cycle, the write data drivers 167$x$ are disabled, and the read sense amplifiers 167$y$ read the state of the addressed cells.

The main limit on the speed at which this device can be run will be imposed by the time required to perform a matched write when most of the cells are writing new data. Here, the write drivers must supply sufficient current to override the drive capabilities on all 256 of the cell transistors if necessary. In order to speed this process, the pull up devices in the memory cell are made much lower powered than the pull down devices, so that the side of the cell being pulled down by the read/write lines will require a minimum of sink current capability in the drivers Once one side of the memory cell is pulled to a low value, the other side becomes much easier to pull high. In order to assist the cell pull up devices when a read cycle is being performed, the read/write lines must be precharged in the cycle before the read occurs.

Another speed improvement is gained at the expense of cell size by using two transistors to decouple the two sides of each memory cell during a write cycle. In this case, the read/write lines must be separated, as the write must be performed to the gates of the inverter transistors, and the reads from the outputs of the inverter transistors. If a p type transistor is used to couple and decouple the inverters, it can be driven from the same read/write enable signal which connects the write lines to the inverter transistor gates. The main area overhead is likely to be the space required for the extra set of read lines; the memory becomes effectively triple ported instead of double ported. The modified circuit is shown in FIGS. 16W and X.

The following operations are each performed in a single clock phase, by asserting the appropriate clock connections.

$\phi_{pm}$: Precharge Match Lines. The match lines are precharged.

$\phi_s$: Sample. The sample data is driven onto the sample data lines. In any word where bits do not match the cell contents, the match line is discharged.

$\phi_{mw}$: Write Data in Matched Words. The data to be written is driven onto the write lines. In those cells where the match line remained high during the previous phase, the write enable line is driven high; this decouples the two inverters in each memory cell and connects the inputs of those inverters to the write data lines. The inverters switch to the state of the write data lines. At the end of the phase, the two inverters are reconnected so that the value written will be stored statically during the subsequent clock phases. Note: it may be beneficial to start driving the data to be written onto the write lines in the previous cycle, so that the capacitance of the write lines is precharged to the write data state. This is called the write precharge cycle.

$\phi_{pr}$: Precharge Read Data Lines. The read data lines are precharged.

$\phi_r$: Read. The read enable line in the word addressed by the address decoders is driven high. The outputs of the inverters in this word are connected to the (precharged) read lines. The read sense amplifiers determine the value of the addressed word.

$\beta_w$: Write. The write data is driven onto the write data lines. The write enable line for the word addressed by the address decoders is driven high; this disconnects the inverters in the addressed cell, and connects the inverter input gates to the write data lines. The inverters take up the state of the write data lines. At the end of the phase, the inverters are reconnected so that the word stores its value statically in subsequent clock phases. Note: It may be beneficial to start driving the data to be written onto the write lines in the previous cycle so that the capacitance of the write lines is precharged to the write data state. This is called the write precharge cycle.

It is possible to fit one read cycle and one match write cycle into four clock phases in three different ways:

| Phase | Match Write | Read(1) | (Read(2) | Read(3) |
|---|---|---|---|---|
| 1 | $\phi_{pm}$ | $\phi_{pr}$ | $\phi_r$ | — |
| 2 | $\phi_s$ | $\phi_r$ | — | — |
| 3 | $\phi_w$ | — | — | $\phi_{pr}$ |
| 4 | — | — | $\phi_{pr}$ | $\phi_r$ |

Alternatively, it is possible to overlap two reads and one match write in four clock phases.

| Phase | Match Write | Read |
|---|---|---|
| 1 | $\phi_{pm}$ | $\phi_{pr}$ |
| 2 | $\phi_s$ | $\phi_r$ |
| 3 | $\phi_w$ | $\phi_{pr}$ |
| 4 | — | $\phi_r$ |

In the control logic system 167p of FIG. 16U loading the values into the window registers and performing the labelling decisions must be pipelined. Consider a join operation between a pixel T from the previous line and a pixel L from the current line: As the labelled pixel from the previous line enters the component, it must be looked up in the CAM 167r in order to discover the root of its region. The lookup on the pixel L can be avoided since it was just generated on the previous cycle, and therefore we can be certain that it is its own root. The two root values will be equivalenced by a match write in the CAM. If the lookup of the T pixel is pipelined far ahead, it is possible that the value returned from the lookup will be outdated by some other join operation before this pixel can be used. This could cause the set tree to become more than one level high, which would upset all subsequent labelling.

When a join is performed, either the T or the L pixel could be used at the new root of the combined region. It is assumed that the T pixel is always used as the new root. If two pixels on the previous line are adjacent, then they must both already have the same root, as they will have been joined on the previous line. This means that any join involving the first of these pixels cannot possibly alter the root of the second of the pixels. This allows one clock cycle for the pixel lookup to be performed without any risk of invalidating the result. Note that the address decode can be pipelined, as the address, which is the value of the label actually used for the T pixel, does not change, only the contents of the location are subject to change.

FIG. 16Y is a block diagram showing the pipelined register layout of the control logic. In FIG. 16Y, each rectangular box represents a clocked register module. Signals move from one register to the next in every cycle. Arrows labelled CL indicate connections to the control logic 167p. A signal is clocked into the register advance 168a every clock cycle from input IN0. A true value is clocked in whenever a new valid pixel is clocked into newP, and also for a number of clock cycles at the end of each line after the last valid pixel of the line has arrived. This signal is an indication that all the registers should move forwards. If this signal is false, most of the registers reload their previous value on each clock cycle. A counter 168b is used to generate the labels for the object regions.

The new bilevel pixel arrives at input IN1. This value is clocked through registers new0, new1, new2, new3, and new4 whenever advance in true. The output of register new3 corresponds to the Cb register of discussions above and new4 is Lb. The outputs from new1 and new2 are used for determining whether lookahead is possible.

Corresponding labelled pixels from the line delay memory arrive at input IN2 in synchronism with new pixels. These values are clocked through registers mem0, mem1, mem2, mem3 whenever advance is true. Conceptually, the value in mem3 is passed through the CAM lookup in one clock cycle and clocked into register mem4. In practice, the address decode will require one or more clock cycles, so the CAM read address will be taken from mem2 (as shown) or further back. Since the decoded address is hard to recirculate if the pipeline is stopped, the advance flag merely sets the state of a multiplexer which selects the input to the CAM address decoder to either mem2 (normal case) or mem3 (otherwise). (In this way, on the last non advancing cycle, the CAM address decoder will be decoding the address of the byte held in mem3. On the next cycle, the looked up value corresponding to mem3 will be clocked into mem4.) In the case where address decoding takes more than one cycle of lookahead, a delayed version of the advance signal will be needed to correctly set the multiplexing for the input to the address decoders. The looked up value is clocked through mem4 and mem5. Note also that the contents of mem4 are also presented at the CAM match-write data for possible equivalencing steps. The CAM select data is taken from the out register.

The bilevel values corresponding to the previous line of pixels are reconstructed from the output of mem0, by comparing the labelled pixel with zero. The reconstructed bilevel pixels are clocked through top1, top2, top3, and top4 whenever advance is true. Register top3 corresponds to Tb in previous discussions, and register top4 corresponds to TLb. The outputs from top1 and top2 are used for examining the possibility of lookahead as appropriate.

A valid signal indicating the duration of each line is brought into the subsystem at IN3, and propagated through registers valid1, valid1, valid2, valid3, valid4, and valid5 whenever advance is true. Note that valid5 is cleared to false whenever advance is false; if this were not done, multiple copies of the previous valid pixels would be output while the pipeline were stopped.

Another signal, called topline, is brought in at IN4 and passed through registers topline0, topline1, topline2, and topline3 whenever advance is true. This signal is active when the current signal arriving at IN1 is the first line of a frame. This means that the data being fetched from the line delay memory is invalid, and should be ignored. The registers top1, top2, top3, and top4 receive an input from topline0, topline1, topline2, and topline3, respectively, and load zero rather than the value from the previous stage of the pipeline if the topline signal is true.

The counter register is used to count from 1 upwards. It is used to generate new labels as required.

The out register is the equivalent of the L register in previous discussions. The outgoing labelled pixel is taken from this register whenever valid5 is true. In addition the value written back to the line delay memory is taken from here whenever valid 5 is true. The input to the out register is taken from a multiplexer, which selects one of:
1. Zero—used when the pixel represents background.
2. The value read from the counter—used when a new label is required.
3. The previous value of the out register—either when the label used for the pixel to the left is to be used for a new pixel, or when the pipeline is halted, to recirculate the value of the out register.
4. The value from mem5—used when the label used for the T pixel is to be used for the new pixel.
5. The value from mem4—used when the label used for the T pixel is to be used for the new pixel.
6. The value from mem3—used when the label used for the TR pixel is to be used for the new pixel; this occurs when one stage of lookahead selects the new pixel value.
7. The value from mem2—used when the label used for the T pixel is to be used for the next pixel; this occurs when two stages of lookahead select the new pixel value.

The out register multiplexer is controlled from the state register. This allows two pipelined stages to be used to compute the required action in any given configuration. Clearly, more stages could be used, as the configuration of binary pixels which is used to set the stage register can be read from farther back along the topn and a newn pipelines. Here just a single stage of pipelining in this computation is shown.

The state register is set by a block of combinational logic shown as CL in the figure. This logic is normally set based upon the values of top4, top3, new4, and new3, which are the values of the bilevel pixels in the registers previously referred to as TLb, Tb, Lb, and Cb. In special cases (such as lookahead), other logic values are used to set the state. Sixteen possible states are defined by these four variables, and these map into the following cases:
1. CASE-NO-PIXEL: New3 is zero, indicating a background pixel.
2. CASE-NEW-LABEL: Only new3 is non-zero, indicating a new label. Where lookahead is being used, this state could be mapped into CASE-USE-TR or CASE-USE-TRR. In addition, the counter logic is set to increment the counter by one on the following cycle.
3. CASE-USE-TL: only top4 and new3 are non-zero. If six connectivity is enabled, then state is CASE-USE-TL, otherwise this state maps into CASE-NEW-LABEL. If state is CASE-USE-TL, then the multiplexer for the out register will be set to select the TL value (from register mem5) on the next cycle.
4. CASE-USE-T: Top3 and new 3 show object pixels; top4 and new4 may be zero or one. The multiplexer will be set to select the T value (from register mem4) on the next cycle. Note that if top3, new3, and new4 all show object pixels but top4 does not, then this state maps into CASE-JOIN-USE-T.
5. CASE-USE-TR: This is a substate of CASE-NEW-LABEL. When only new3 is zero, indicating that a new label is apparently required, lookahead is used. If new2 shows an object pixel and top2 also, then mem2 contains a labelled pixel which will be connected to the current pixel on the next cycle. Therefore the multiplexer will be set to select register mem3 (where the contents of mem2 will be next cycle), and a new label is not generated. Note that this label will not have been looked up in the CAM. This does not matter, as at least one other pixel exists with the same value, so the CAM will already contain any joins for that value to connect it with any other subregions.
6. CASE-USE-TRR: As above, this is the lookahead two pixel case. When new2 and ne1, and top1 all shown an object pixel, then mem1 contains a labelled pixel which will be joined to the current pixel in two cycles. The multiplexer will be set to select register mem2 (where the contents of mem1 will be on the next cycle).
7. CASE-USE-L: Only new4 and new3 shown object pixels. The label used for the previous pixel will be replicated by setting the multiplexer to select the value in the out register on the next cycle.

8. CAse-JOIN-USE-T: This is the join case; the CAM match write cycle is enabled, and the T value from the mem3 register will be used for the out register.

Note that there is no time to compare the two values being joined in the CAM before the start of the CAM write cycle. However, they can be compared as the match cycle is started, and the write aborted if they are found to be the same. This could save some unnecessary write cycles and therefore save some power dissipation in the CAM.

9. CASE-RECIRCULATE: The out pixel is copied while the pipeline is stopped. No CAM write cycles occur.

Note also that in the JOIN case, it is essential that the T value be used (this is the value which was just looked up in the CAM). This ensures that the out register always contains a labelled pixel which is its own root. When a new label operation is performed, the new value is its own root by definition. When another value is copied from mem5 or mem4, these have been looked up by the CAM and must also be their own root. (If the value is being taken from mem5, then mem4 must be a background pixel, so a join cannot be performed which would invalidate the value looked up for mem5). When lookahead is being used, the value copied into the out register has not been looked up in the CAM; this could cause problems. However, in one or two cycles, this value will be joined to the looked up value in mem4; such a join must be a null join, as it is joining the value originally used to label the pixel on the previous line with the root of that label. However, after this, the out register will contain the correct root again.

A completely labelled image can be achieved with the system of FIG. 16Z in the following manner. The partially labelled image is fed into a frame buffer 169a where it is stored until the end of the frame. At this time, the processor 44 accesses the join equivalence data from the binary region labeller component 150 and programs a lookup table 169b to perform the equivalencing operation. The partially labelled image is output from the frame buffer 169a and sent through the lookup table 169b. The final output from the lookup table 169b is the fully labelled image.

In some circumstances, the partially labelled data may be adequate. In particular, when the labelled image is being input to a set of statistics components 152, each of which is computing some statistic of interest for each region in the object, then it is sufficient to compute the statistics for each partial region, and sum them together as indicated by the equivalence data at the end of the frame before computing object parameters from the statistics.

Although this summation could be performed by the processor, a more efficient embodiment performs the summation of the accumulated quantities in the accumulator of each stat component 152 at the state component itself. In this embodiment, the binary region labeller 150 sends a "mini-frame" to the stat component 152 over the label bus 151 (FIG. 15) after the original frame has been completely labelled. This mini-frame consists of the equivalence data from the CAM 167r (FIG. 16U).

FIG. 17 illustrates the operation of the statistics component 152. The statistics component 152 includes a set of 256 accumulators 170. A signal routing circuit 172 directs the value of the signal at the increment of the statistics component 152 to a selected accumulator 170. The value at the increment input port of the statistics component 152 determines which accumulator receives the increment signal. Thus, the statistics component is a multi-statistics gathering system that simultaneously accumulates functional values for one or more object regions per frame. A full description of the structure and operation of a statistics component 152 for use in the present invention is provided in the copending patent application by Deering, entitled MULTISTATISTICS GATHERER, filed Oct. 7, 1985. This application is hereby incorporated by reference.

The operation of the architecture depicted in FIG. 15 will now be described. Assume tht the perimeter of the first and second objects is to be computed at the Stat 5 component 152. The relative time frames of the binary region labeller component 150 and ABP/LUT morphology component 52/54 are synchronized so that the label for a given pixel and the functional value for the given pixel are supplied to the statistical component 152 during the same PCLK cycle.

This synchronization may be achieved by either matching the delays introduced by the RL component 150 and the morphology component 52/54 or by utilizing a variable delay element.

The background pixels contribute nothing to the value of the perimeter. When a given pixel in the first object region 164 of the frame 160 is positioned at position 5 of the 3×3 grid, the labeled value of the first region, i.e., 2, is provided to the index input of the second statistics unit by the region labeling unit 150. The functional value generated by the LUT 54 for the given pixel in the first object region 164 will be directed to accumulator 2 by the routing circuitry 172 of the statistics unit 152. As described above, pixels on the boundary of the first region 164 are assigned the functional value of 1 and pixels on the interior of the region are assigned the functional value 0. Accordingly, at the end of the frame cycle, the accumulated value in accumulator 2 will be equal to the macroperimeter of the first region 164.

Similarly, when a given pixel in the second object region 166 is positioned at location 5 of the 3×3 region, the index for the second object region, i.e., 3, is provided to the index input of the statistics chip 152. The functional value for the given pixel in second object region 166 is routed to bin 3 by the routing circuitry 172. Accordingly, the macrovalue of the perimeter of the first region 164 is stored in the second accumulator and the value of the macroperimeter of the second region 166 is stored at the third accumulator at the end of the frame cycle. These values are then transferred to the processor for use in subsequent image analysis.

The architecture of FIG. 15 facilitates the parallel computation of several morphological characteristics of a set of object regions in a frame. These characteristics are computed at the frame rate.

Additionally, the statistical components 152 may compute other characteristics relating to the dimensions, position, and orientation of object regions in a frame. Details for computing these other characteristics are described in the above-referenced patent application by Deering.

Referring back to FIG. 15, note that all statistical components 152 Stat 1-Stat 8 are coupled to receive regions labels from the RL component 150. In FIG. 15, Stat 1 is configured to compute area ($\Sigma 1$), Stat 2 is configured to compute the sum of the x coordinates ($\Sigma x$), Stat 3 is configured to compute the sum of the xy terms (zxy), Stat 4 computes Σy and Stat 6 computes Σx². The characteristics are computed at the frame rate.

Stat 5 and Stat 7 are coupled to the outputs of the LUT 54 that provide perimeter and Euler number functional values. The LUT may be programmed to generate functional data for computing other morphological characteristics, such as edgel (small regions on an object perimeter), orientation, number of a specific corner shape, and spikes or holes in an object region.

The invention has now been described with reference to specific embodiments. Various modifications and substitutions wil be apparent to persons skilled in the relevant arts. Accordingly, it is not intended that the invention be limited except as provided by the appended claims.

What is claimed is:

1. An image processing system for processing frames of binary pixels, with each frame having N lines, $1_n$, n=0, . . . , N-1, and each line having R pixel positions, $P_r$, r=0, . . . , R-1, the pixels being processed at a pixel scan rate, RP, the frames being processed at a frame rate, RF, a frame of pixels processed during a frame cycle, and a line of pixels processed during a line cycle, each frame including object regions of pixels having a first binary value and a background region of pixels having a second binary value, said system comprising:

line delay (LD) means having an LD input port and a set of J LD output ports, where J is a first predetermined integer, for receiving the pixels in a frame and for transferring J pixels, each at the same pixel location in J adjacent lines of said frame, to said J LD output ports;

bit packing means, having J BP input ports, each coupled to a respective one of said J LD output ports, and a set of J×KBP output ports, including at least a first and a second BP output port, where K is a second predetermined integer, for transferring pixels from a J×K rectangular region of said frame, including J adjacent lines and K adjacent pixel positions in each line, to said J×K BP output ports;

a look up table (LUT), having J×K LUT input ports, each coupled to a respective one of said J×K BP output ports, for generating a LUT output signal encoding a selected functional value of the pixel values received at said LUT input ports and for transferring said functional values to said LUT output ports at the pixel scan rate, RP;

region labelling (RL) means, having an RL input coupled to a second BP output port and having an RL output port, said RL means for labelling each connected object region of said frame with a numeric label and for transferring the numeric label of each pixel received to said RL output port; and first multi-statistics gathering (MSG) means, having an increment input port, adapted to receive said LUT output signal, and an index input port coupled to said RL output port and having a plurality of accumulator bins selected by the signal received at said index input port and incremented by the signal received at said increment input port, said MSG means for accumulating the functional values encoded in said output signal generated by said LUT for all pixels in a given numerically labelled region in the accumulator bin indexed by the given numerical label.

2. The invention of claim 1 further comprising:

means for synchronizing the receipt of the numeric label for a given pixel and the functional value for said given pixel at the input ports of said multi-statistics gathering means.

3. The invention of claim 2 wherein the accumulated quantity in each accumulator bin represents a morphological characteristic of an object region and wherein the accumulated quantities are generated at the frame rate FR.

4. The invention of claim 2 or 3 wherein said LUT comprises:

a random access memory (RAM) having a plurality of addressable storage locations, with each of said storage locations for storing a digital word encoding a functional value f(Y) and with each storage location selectable by a unique digital signal (Y) being the pixels transferred to said J×K BP output ports.

5. The invention of claim 4 wherein:

one, or more, bits of each of said words stored in said LUT is equal to a morphological function of y so that the morphological function may be summed over each pixel in each object region of an image.

6. The invention of claim 5 wherein:

a first selected bit in each word stored a location addressed by Y is equal to the first binary value for all Y indicating that the pixel at the center of the J×K region (the center pixel) is adjacent to the boundary of an object region in the frame or included in the object region and wherein the first selected bit is equal to the second binary value otherwise, with said first selected bits being the LUT output signal for performing a grow operation.

7. The invention of claim 5 wherein:

a second selected bit in each word stored in a location addressed by Y is equal to the second binary value for all Y indicating that the center pixel is positioned on the boundary of an object region or positioned in the background region and wherein the second selected bit is equal to the first binary value otherwise, with said second selected bits being the LUT output signal for a performing shrink operation.

8. The invention of claim 5 wherein:

a third selected bit in each word stored in a location addressed by Y is equal to one for all Y indicating that the center pixel is on the boundary of an object region and the third selected bit is zero otherwise;

and further comprising:

means for accumulating the values of the third selected bit over one frame cycle to generate a measure of the macroperimeter of an object region.

9. The invention of claim 5 wherein:

fourth and fifth selected bits in each word stored at a location addressed by Y are equal to the binary representation of (+1) for all Y indicating that the center pixel in an object region has one edge adjacent to the background, are equal to the binary representation for (+2) for all Y indicating that a center pixel has two edges adjacent to the background region, is equal to the binary representation for (3+) for all Y indicating that a center pixel has 3 edges adjacent to the background region, and are equal to zero otherwise;

and further comprises:

means for accumulating the values indicated by said fourth and fifth selected bits over one frame cycle to generate a measure of the microperimeter of the object region.

10. The invention of claim 5 wherein:

sixth and seventh selected bits of each word stored in a location addressed by Y are equal to the binary representation of (+1) for all Y indicating that the center pixel is at the top left hand corner of an object region, are equal to the binary representation of (−1) for all Y indicating that the center pixel is at the bottom inside right corner boundary of a hole in an object region, and are equal to zero otherwise;

and further comprising:

means for accumulating the value indicated by said sixth and seventh bits over one frame cycle to generate the Euler number of said object region.

11. The invention of claim 2 further comprising:

second multistatistics gathering having an index port coupled to said RL output port and having a plurality of accumulator bins selected by the signal received at said index port, with said second multistatistics gathering means configured to compute dimensional, positional, or orientational characteristics of said object regions.

12. An image processing system for processing frames of binary pixels, with each frame having N lines, $1_n$, n=0, ..., N-1, and each line having R pixel positions, $P_r$, r=0, ..., R-1, the pixels being processed at a frame scan rate, RP, the frames being processed at a frame rate, RF, a frame of pixels processed during a frame cycle, and a line of pixels processed during a line cycle, each frame including object regions of pixels having a first binary value and a background region of pixels having a second binary value, said system comprising:

means for providing a digital signal comprising the pixel values of a J×K region of the frame;

means for generating desired functional values, at the frame scan rate, RP, for selected values of said digital signal;

means for accumulating said selected functional values over one frame cycle with the accumulated value being the value of a morphological characteristic of an object region;

means for labelling each object region in a frame with a numerical index; and wherein said means for accumulating comprises:

a first plurality of accumulators labelled by numerical indices; and routing means for directing the selected functional values of said digital signals corresponding to pixels associated with an object region labelled by a given index to the accumulator in said first plurality labelled by the given index so that the morphological characteristics of each object region in a frame may be computed.

13. The invention of claim 12 further comprising:

a second plurality of accumulators labelled by numerical indices;

means for computing a selected functional value of the (x,y) co-ordinates of the pixels in a frame;

routing means for directing the selected functional values of the pixels in an object region labelled by a given index to the accumulator in said second plurality labelled by said given index so that dimensional, positional, and orientational characteristics of said object regions may be computed at the same time and in parallel to said morphological characteristics.

14. The invention of claim 12 or 13 further comprising:

means for generating data noting equivalence of the labels for mislabelled subregions of a given object region;

means for adding characteristics of the equivalent mislabelled subregion of said given object region to determine the characteristic of the given region.

15. The invention of claim 14 wherein said accumulators, means for directing, and means for adding are disposed in a multi-statistics gathering component.

* * * * *